US008046096B2

(12) United States Patent
Denison et al.

(10) Patent No.: US 8,046,096 B2
(45) Date of Patent: Oct. 25, 2011

(54) ANALYTICAL SERVER INTEGRATED IN A PROCESS CONTROL NETWORK

(75) Inventors: David R. Denison, Austin, TX (US); Marty James Lewis, Cedar Park, TX (US); Peter Wojsznis, Cedar Park, TX (US); Ashish Mehta, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 12/782,946

(22) Filed: May 19, 2010

(65) Prior Publication Data

US 2010/0228363 A1 Sep. 9, 2010

Related U.S. Application Data

(60) Division of application No. 11/537,826, filed on Oct. 2, 2006, now Pat. No. 7,738,975, which is a continuation-in-part of application No. 11/243,862, filed on Oct. 4, 2005, now Pat. No. 7,444,191.

(51) Int. Cl.
*G06F 19/00* (2011.01)
(52) U.S. Cl. ............................ 700/117; 702/138; 701/25
(58) Field of Classification Search .................. 700/1, 9, 700/11, 28, 29, 83, 52, 100, 107–109, 117, 700/167, 204, 266; 347/12, 41, 310.11; 703/174; 702/138, 145, 113–115; 701/25, 35, 29, 701/31
See application file for complete search history.

(56) References Cited

U.S. PATENT DOCUMENTS

| 3,671,725 A | 6/1972 | Bakke |
| 3,767,900 A | 10/1973 | Chao et al. |
| 4,029,122 A | 6/1977 | Jaegtnes |
| 4,054,780 A | 10/1977 | Bartley et al. |
| 4,313,465 A | 2/1982 | Holzem et al. |
| 4,376,450 A | 3/1983 | Fayfield et al. |

(Continued)

FOREIGN PATENT DOCUMENTS

DE 42 32 826 10/1993

(Continued)

OTHER PUBLICATIONS

Neitzel et al., A Simple Real-Time Process control Experiment Using Serial communication, Jan. 2001, Jphm Wiley & Sons Inc. , p. 101-104.*
Beatty, "Intelligent Valve Based Process Sensing and Control," *ISA, 46 Advances in Instrumentation and Control No. 2*, pp. 1175-1185 (1991).
Charbonneau, "Early Diagnosis of Motor Operated Valve Mechanical and Electrical Degradations," *The American Society of Mechanical Engineers*, 84-NE-16 (1984).

(Continued)

*Primary Examiner* — Kidest Bahta
(74) *Attorney, Agent, or Firm* — Marshall, Gerstein & Borun LLP

(57) ABSTRACT

A process control system integrates the collection and analysis of process control data used to perform certain computationally expensive process control functions, like adaptive model generation and tuning parameter generation, in the same control device in which one or more of the process control routines are implemented, to thereby provide for faster and more efficient support of the process control routines. This system replaces a layered approach using multiple processing devices by integrating an analytical server which performs computationally expensive analyses used by one or more control routines directly into the real-time control device in which the one or more control routines are located. This integration provides the ability to analyze large quantities of data for multiple process loops controlled by a particular device in a fast and efficient manner.

16 Claims, 9 Drawing Sheets

U.S. PATENT DOCUMENTS

| | | | |
|---|---|---|---|
| 4,523,286 A | 6/1985 | Koga et al. | |
| 4,542,649 A | 9/1985 | Charbonneau et al. | |
| 4,555,766 A | 11/1985 | Wright | |
| 4,590,963 A | 5/1986 | Gardner et al. | |
| 4,615,722 A | 10/1986 | Steffan et al. | |
| 4,617,960 A | 10/1986 | More | |
| 4,641,235 A | 2/1987 | Shigemasa et al. | |
| 4,660,416 A | 4/1987 | Charbonneau et al. | |
| 4,672,529 A | 6/1987 | Kupersmit | |
| 4,690,003 A | 9/1987 | McNennamy et al. | |
| 4,693,113 A | 9/1987 | McNennamy et al. | |
| 4,694,390 A | 9/1987 | Lee | |
| 4,694,391 A | 9/1987 | Guttag et al. | |
| 4,712,071 A | 12/1987 | Charbonneau et al. | |
| 4,742,713 A | 5/1988 | Abe et al. | |
| 4,831,873 A | 5/1989 | Charbonneau et al. | |
| 4,833,593 A | 5/1989 | Takeuchi et al. | |
| 4,858,103 A | 8/1989 | Takeuchi et al. | |
| 4,908,774 A | 3/1990 | Lund et al. | |
| 4,908,775 A | 3/1990 | Palusamy et al. | |
| 4,916,628 A | 4/1990 | Kugler | |
| 4,926,903 A | 5/1990 | Kawai | |
| 4,949,288 A | 8/1990 | Bookout | |
| 4,976,144 A | 12/1990 | Fitzgerald | |
| 4,977,778 A | 12/1990 | Nafziger et al. | |
| 4,980,825 A | 12/1990 | Tootell et al. | |
| 5,000,040 A | 3/1991 | Charbonneau et al. | |
| 5,018,215 A | 5/1991 | Nasr et al. | |
| 5,043,863 A | 8/1991 | Bristol et al. | |
| 5,086,273 A | 2/1992 | Leon | |
| 5,109,692 A | 5/1992 | Fitzgerald | |
| 5,140,263 A | 8/1992 | Leon | |
| 5,154,080 A | 10/1992 | Hill et al. | |
| 5,159,547 A | 10/1992 | Chand | |
| 5,159,835 A | 11/1992 | Nafziger et al. | |
| 5,180,896 A | 1/1993 | Gibby et al. | |
| 5,197,328 A | 3/1993 | Fitzgerald | |
| 5,198,973 A | 3/1993 | Steutermann | |
| 5,228,342 A | 7/1993 | McShane | |
| 5,233,542 A | 8/1993 | Hohner et al. | |
| 5,245,528 A | 9/1993 | Saito et al. | |
| 5,251,148 A | 10/1993 | Haines et al. | |
| 5,253,185 A | 10/1993 | Mutchler et al. | |
| 5,272,621 A | 12/1993 | Aoki et al. | |
| 5,272,647 A | 12/1993 | Hayes | |
| 5,319,539 A | 6/1994 | Shinskey | |
| 5,320,123 A | 6/1994 | Corso et al. | |
| 5,329,465 A | 7/1994 | Arcella et al. | |
| 5,329,956 A | 7/1994 | Marriott et al. | |
| 5,335,164 A | 8/1994 | Gough, Jr. et al. | |
| 5,337,262 A | 8/1994 | Luthi et al. | |
| 5,347,446 A | 9/1994 | Iino et al. | |
| 5,394,322 A | 2/1995 | Hansen | |
| 5,396,167 A | 3/1995 | Leon | |
| 5,396,416 A | 3/1995 | Berkowitz et al. | |
| 5,402,333 A | 3/1995 | Cardner | |
| 5,408,406 A | 4/1995 | Mathur et al. | |
| 5,410,470 A | 4/1995 | Yamaoka et al. | |
| 5,414,648 A | 5/1995 | Morgan et al. | |
| 5,420,785 A | 5/1995 | Shinskey | |
| 5,425,270 A | 6/1995 | McDonald et al. | |
| 5,433,245 A | 7/1995 | Prather et al. | |
| 5,451,923 A | 9/1995 | Seberger et al. | |
| 5,453,925 A | 9/1995 | Wojsznis et al. | |
| 5,461,559 A | 10/1995 | Heyob et al. | |
| 5,475,299 A | 12/1995 | Leon | |
| 5,477,149 A | 12/1995 | Spencer et al. | |
| 5,487,302 A | 1/1996 | Casada et al. | |
| 5,488,561 A | 1/1996 | Berkowitz et al. | |
| 5,519,605 A | 5/1996 | Cawlfield | |
| 5,555,171 A | 9/1996 | Sonehara et al. | |
| 5,557,546 A | 9/1996 | Fukai et al. | |
| 5,564,470 A | 10/1996 | Denmark et al. | |
| 5,568,378 A | 10/1996 | Wojsznis | |
| 5,586,305 A | 12/1996 | Eidson et al. | |
| 5,587,899 A | 12/1996 | Ho et al. | |
| 5,625,552 A | 4/1997 | Mathur et al. | |
| 5,687,098 A | 11/1997 | Grumstrup et al. | |
| 5,740,033 A | 4/1998 | Wassick et al. | |
| 5,748,467 A | 5/1998 | Qin et al. | |
| 5,838,561 A | 11/1998 | Owen | |
| 5,909,370 A | 6/1999 | Lynch | |
| 5,933,345 A | 8/1999 | Martin et al. | |
| 5,950,006 A | 9/1999 | Crater et al. | |
| 5,966,679 A | 10/1999 | Snowbarger et al. | |
| 5,995,753 A | 11/1999 | Walker | |
| 6,003,037 A | 12/1999 | Kassabgi et al. | |
| 6,026,352 A | 2/2000 | Burns et al. | |
| 6,041,320 A | 3/2000 | Qin et al. | |
| 6,047,221 A | 4/2000 | Piche et al. | |
| 6,047,222 A * | 4/2000 | Burns et al. | 700/79 |
| 6,049,738 A | 4/2000 | Kayama et al. | |
| 6,056,781 A | 5/2000 | Wassick et al. | |
| 6,088,630 A | 7/2000 | Cawlfield | |
| 6,112,517 A | 9/2000 | Yasui et al. | |
| 6,128,541 A | 10/2000 | Junk | |
| 6,144,897 A | 11/2000 | Selliers | |
| 6,192,321 B1 | 2/2001 | Grumstrup et al. | |
| 6,195,591 B1 | 2/2001 | Nixon et al. | |
| 6,195,988 B1 | 3/2001 | Yasui et al. | |
| 6,201,996 B1 | 3/2001 | Crater et al. | |
| 6,249,712 B1 | 6/2001 | Boiquaye | |
| 6,278,899 B1 | 8/2001 | Piche et al. | |
| 6,330,484 B1 | 12/2001 | Qin | |
| 6,353,766 B1 | 3/2002 | Weinzierl et al. | |
| 6,445,962 B1 | 9/2002 | Blevins et al. | |
| 6,445,963 B1 | 9/2002 | Blevins et al. | |
| 6,473,670 B1 | 10/2002 | Huhtelin | |
| 6,487,459 B1 | 11/2002 | Martin et al. | |
| 6,577,908 B1 | 6/2003 | Wojsznis et al. | |
| 6,601,005 B1 | 7/2003 | Eryurek et al. | |
| 6,647,315 B1 * | 11/2003 | Sherriff et al. | 700/204 |
| 6,654,649 B2 | 11/2003 | Treiber et al. | |
| 6,684,150 B2 | 1/2004 | Yasui et al. | |
| 6,697,767 B2 | 2/2004 | Wang et al. | |
| 6,711,531 B1 | 3/2004 | Tanaka et al. | |
| 6,712,669 B1 | 3/2004 | Chang | |
| 6,735,483 B2 | 5/2004 | Martin et al. | |
| 6,738,677 B2 | 5/2004 | Martin et al. | |
| 6,745,088 B2 | 6/2004 | Gagne | |
| 6,757,579 B1 | 6/2004 | Pasadyn | |
| 6,772,036 B2 | 8/2004 | Eryurek et al. | |
| 6,795,798 B2 | 9/2004 | Eryurek et al. | |
| 6,819,999 B2 * | 11/2004 | Hartzheim | 701/100 |
| 6,834,226 B2 * | 12/2004 | Hartzheim | 701/100 |
| 6,839,599 B2 | 1/2005 | Martin et al. | |
| 6,885,907 B1 | 4/2005 | Zhang et al. | |
| 6,901,300 B2 | 5/2005 | Blevins et al. | |
| 6,938,843 B2 | 9/2005 | Johansson | |
| 6,950,711 B2 | 9/2005 | Havener et al. | |
| 6,950,741 B2 | 9/2005 | Ishikawa et al. | |
| 7,047,089 B2 | 5/2006 | Martin et al. | |
| 7,050,863 B2 | 5/2006 | Mehta et al. | |
| 7,050,866 B2 | 5/2006 | Martin et al. | |
| 7,054,706 B2 | 5/2006 | Kempf et al. | |
| 7,058,617 B1 | 6/2006 | Hartman et al. | |
| 7,110,834 B2 | 9/2006 | Martin et al. | |
| 7,113,834 B2 | 9/2006 | Wojsznis et al. | |
| 7,149,590 B2 | 12/2006 | Martin et al. | |
| 7,181,295 B2 | 2/2007 | Yu et al. | |
| 7,187,989 B2 | 3/2007 | Attarwala | |
| 7,188,637 B2 | 3/2007 | Dreyer et al. | |
| 7,194,318 B2 | 3/2007 | Attarwala | |
| 7,203,555 B2 | 4/2007 | Ogunnaike et al. | |
| 7,213,006 B2 | 5/2007 | Hartman et al. | |
| 7,337,022 B2 | 2/2008 | Wojsznis et al. | |
| 7,340,336 B2 | 3/2008 | Yasui et al. | |
| 7,359,830 B2 | 4/2008 | Hupkes et al. | |
| 7,376,472 B2 | 5/2008 | Wojsznis et al. | |
| 7,391,712 B2 | 6/2008 | Geile et al. | |
| 7,418,301 B2 | 8/2008 | Boe et al. | |
| 7,444,191 B2 | 10/2008 | Caldwell et al. | |
| 7,451,004 B2 | 11/2008 | Thiele et al. | |
| 7,486,998 B2 | 2/2009 | Ogunnaike et al. | |
| 7,489,623 B2 | 2/2009 | Geile | |
| 7,515,977 B2 | 4/2009 | Eryurek et al. | |
| 7,551,969 B2 | 6/2009 | Wojsznis et al. | |

| | | | |
|---|---|---|---|
| 7,590,511 B2 * | 9/2009 | Huisenga et al. | 702/183 |
| 7,610,108 B2 | 10/2009 | Boe et al. | |
| 7,650,195 B2 | 1/2010 | Fan et al. | |
| 7,783,370 B2 | 8/2010 | Nixon et al. | |
| 7,826,909 B2 | 11/2010 | Attarwala | |
| 7,930,044 B2 | 4/2011 | Attarwala | |
| 2002/0123864 A1 | 9/2002 | Eryurek et al. | |
| 2003/0014131 A1 | 1/2003 | Havener et al. | |
| 2003/0195641 A1 | 10/2003 | Wojsznis et al. | |
| 2005/0088320 A1 | 4/2005 | Kovach | |
| 2005/0096872 A1 | 5/2005 | Blevins et al. | |
| 2005/0149209 A1 | 7/2005 | Wojsznis et al. | |
| 2006/0111858 A1 | 5/2006 | Zhu | |
| 2007/0078533 A1 | 4/2007 | Caldwell et al. | |
| 2007/0129917 A1 | 6/2007 | Blevins et al. | |
| 2007/0142936 A1 | 6/2007 | Denison et al. | |
| 2007/0156264 A1 | 7/2007 | Schleiss et al. | |
| 2007/0168060 A1 | 7/2007 | Nixon et al. | |
| 2007/0208549 A1 | 9/2007 | Blevins et al. | |
| 2007/0244575 A1 | 10/2007 | Wojsznis et al. | |
| 2008/0066004 A1 | 3/2008 | Blevins et al. | |
| 2008/0300709 A1 | 12/2008 | Collette, III et al. | |
| 2009/0105855 A1 | 4/2009 | Mehta et al. | |
| 2009/0112335 A1 | 4/2009 | Mehta et al. | |
| 2009/0125128 A1 | 5/2009 | Eldridge et al. | |
| 2009/0198350 A1 | 8/2009 | Thiele | |
| 2009/0287319 A1 | 11/2009 | Attarwala | |
| 2009/0319060 A1 | 12/2009 | Wojsznis et al. | |
| 2010/0241247 A1 | 9/2010 | Attarwala | |

FOREIGN PATENT DOCUMENTS

| | | |
|---|---|---|
| DE | 42 18 320 | 12/1993 |
| EP | 0 275 629 | 7/1988 |
| EP | 0 315 391 | 5/1989 |
| EP | 0 462 432 | 12/1991 |
| EP | 0 482 900 | 4/1992 |
| EP | 0 572 245 | 12/1993 |
| EP | 0 637 713 | 2/1995 |
| EP | 0 660 017 | 6/1995 |
| EP | 0 708 389 | 4/1996 |
| EP | 1 284 446 | 2/2003 |
| GB | 2 194 648 | 3/1988 |
| GB | 2 196 445 | 4/1988 |
| GB | 2 348 020 A | 9/2000 |
| GB | 2 371 884 | 8/2002 |
| GB | 2 400 924 A | 10/2004 |
| GB | 2 409 293 A | 6/2005 |
| JP | 62-89908 | 4/1987 |
| JP | 62-229 044 | 10/1987 |
| JP | 2003-293344 | 10/2003 |
| WO | WO-97/12300 A2 | 4/1997 |
| WO | WO-97/16776 | 5/1997 |
| WO | WO-00/14611 | 3/2000 |
| WO | WO-00/33209 | 6/2000 |
| WO | WO-01/98845 | 12/2001 |
| WO | WO-02/057856 | 7/2002 |
| WO | WO-2004/070569 A2 | 8/2004 |
| WO | WO-2005/062906 A2 | 7/2005 |
| WO | WO-2008/030374 A2 | 3/2008 |
| WO | WO-2008/119008 A1 | 10/2008 |
| WO | WO-2009/120362 A2 | 10/2009 |

OTHER PUBLICATIONS

Chen et al., "Interactive On-line Optimization System", Mineral Processing Research Institute—Louisiana State University (2001).
European Search Report and Search Opinion for Application No. 08165431.1, dated Sep. 9, 2010.
De Persis, et al., "Further results on switched control of linear systems with constraints," *Proceedings of the 41st IEEE Conference on Decision and Control*, Las Vegas, NV, USA, pp. 2810-2815 (2002).
Dimmick et al., "Ultrasonic Leak Detection Cuts Valve Maintenance Costs," *Power Engineering*, pp. 35-38 (1986).
Electronic Power Research Institute, "Improvements in Motor-Operated Valves," EPRI NP-4254 (1985).
Electronic Power Research Institute, "Key Valves Prioritization Study," EPRI NP-3611 (1984).
English-language translation of First Chinese Office Action for Application No. 200610131873.1, dated Jan. 15, 2010.
English-language translation of Second Chinese Office Action for Application No. 200610131873.1, dated Aug. 13, 2010.
Examination Report for Application No. GB0619591.1, dated Jun. 18, 2010.
Examination Report for Application No. GB0719216.4, dated Oct. 28, 2010.
Examination Report under Section 18(3) issued by the United Kingdom Patent Office on Feb. 14, 2006 for GB Application No. 0408598.1.
Fieldvue™, "Digital Valve Controller DVC5000 Series Remotely Accessible Information," Bulletin 62.1:DVC5000(S1), (1994).
Fieldvue™, "Digital Valve Controller Type DVC5000 Series," Instruction Manual, (1995).
Fieldvue™, "Digital Vave Controller Type DVC5000 Series," Bulletin 62.1:DVC5000, (1994).
Hanagud et al., "Artificial Intelligence—Based Model-Adaptive Approach to Flexible Structure Control," *American Institute of Aeronautics and Astronautics, Inc.*, 13(3):534-544 (1987).
Harris, "Assessment of Control Loop Performance", *The Canadian Journal of Chemical Engineering*, 67:856-861 (1989).
Henson, "Nonlinear Model Predictive Control: Current Status and Future Directions", *Computers and Chemical Engineering*, 23:187-202 (1998).
Hespanha et al., "Overcoming the limitations of adaptive control by means of logic-based switching," *Systems and Control Letters*, 49:49-65 (2003).
Hespanha et al., "Stabilization of Nonholonomic Integrators via Logic-Based Switching," *Automatica*, pp. 385-394 (1999).
Hägglund, et al., "Industrial Adaptive Controllers Based on Frequency Response Techniques," *Automatica*, 27(4):599-609 (1991).
International Search Report in PCT/US01/19706 dated Oct. 23, 2001.
International Search Report in PCT/US98/19375 dated Feb. 5, 1999.
International Search Report in PCT/US98/19430 dated Jan. 5, 1999.
Jadbabaie et al., "Coordination of Groups of Mobile Autonomous Agents Using Nearest Neighbor Rules," *IEEE Transactions on Automatic Control*, 48(6):988-1001 (2003).
Liberzon et al., "Basic Problems in Stability and Design of Switched Systems," *IEEE Control Systems Magazine*, pp. 59-70 (1999).
Liberzon et al., "Stability of switched systems: a Lie-algebraic condition," *Systems and Control Letters,*, 37:117-122 (1999).
Morse et al., "Applications of Hysteresis Switching in Parameter Adaptive Control," *IEEE Transactions on Automatic Control*, 37(9) (1992).
Morse, "A Bound for the Disturbance—to-Tracking—Error Gain of a Supervised Set-Point Control System," in *Perspectives in Control: Theory and Applications*, pp. 23-41, Dorothee Normand-Cyrot (ed.), Spring Verlag, New York, (1998).
Morse, "Control Using Logic-based Switching," in *Trends in Control: A European Perspective*, Alberto Isidori (ed.), Springer Verlag, New York (1995).
Narendra et al., "Adaptive Control Using Multiple Models", *IEEE Transactions on Automatic Control*, 42(2):171-187 (1997).
Pait et al., "A Cyclic Setiching Strategy for Parameter-Adaptive Control," *IEEE Transactions on Automatic Control*, 39(6) (1994).
Ramakrishnan et al., "Prediction of Process Parameters for Intelligent Control of Tunnel Freezers Using Simulation", *Journal of Food Engineering*, 65:23-31 (2004).
Robinson, "Autonomous Design and Execution of Process Controllers for Untended Scientific Instruments", ACM (1997).
Search Report for Application No. GB0817813.9, dated Jan. 20, 2009.
Search Report under Section 17 for Application No. GB0719216.4, dated Dec. 19, 2007.
Search Report under Section 17 issued in GB0619591.1 application by United Kingdom Patent Office on Jan. 29, 2007.
Search Report under Section 17(5) issued by the United Kingdom Patent Office on Aug. 18, 2004 for GB Application No. 0408598.1.

\* cited by examiner

ANALYTICAL SERVER INTEGRATED IN A PROCESS CONTROL NETWORK

RELATED APPLICATIONS

This application is a divisional application of U.S. patent application Ser. No. 11/537,826 filed Oct. 2, 2006, entitled "Analytical Server Integrated in a Process Control Network," which in turn is a continuation-in-part application of U.S. patent application Ser. No. 11/243,862 filed Oct. 4, 2005, entitled "Process Model Identification in a Process Control System," the disclosures of which are hereby expressly incorporated herein by reference.

TECHNICAL FIELD

The present invention relates generally to process control systems used within process plants and, more particularly, to a control system that enables the fast and efficient support of process control routines which use computationally expensive algorithms, such as adaptive process control routines that create and update process models during the adaptation procedure.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, and uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV™ system sold by Emerson Process Management, use function blocks or groups of function blocks referred to as modules located in the controller or in different field devices to perform control operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, controlling a device, or performing a control operation, such as the implementation of a proportional-derivative-integral (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as analog input (AI) function blocks, a single-input, single-output (SISO) or a multiple-input, multiple output (MIMO) control block, and one or more output blocks, such as analog output (AO) function blocks.

The control routines used in control loops, and the function blocks that implement such routines, have been configured in accordance with a number of different types of control techniques, including proportional-integral-derivative (PID) control, fuzzy logic control (FLC), and model-based techniques such as a Smith Predictor or model predictive control (MPC), to name but a few. In model-based control techniques, the parameters used in the control routines to determine the closed loop control response are based on the dynamic process responses to changes in a set of manipulated or measured disturbances serving as inputs to the process. A representation of the response of the process to changes in process inputs may be characterized as a process model. For instance, a first-order parameterized process model may specify values for the gain, dead time, and time constant of the process.

One model-based technique, model predictive control (MPC), involves using a number of step or impulse response models designed to capture the dynamic relationships between process inputs and outputs. With MPC techniques, the process model is directly used to generate the controller. When used in connection with processes that experience large changes in process dead time, process delay, etc., the MPC controller must be automatically regenerated using new process models which match the current process condition. In such cases, a process model is accordingly identified at each of a number of operating conditions. However, the introduction of multiple process models and the requisite automatic generation of the controller based on new process models to match the current process condition undesirably increases the complexity and computational requirements of the process control system.

Process models have also been used to set tuning parameters of PID and other control schemes using adaptive control techniques, wherein the tuning parameters of the PID (or other) controller is generally updated as a result of changes in a process model defining the process as well as in response to user-selected tuning rules. Examples of an adaptive PID tuning technique in which process models are developed and used to tune PID controllers is described in detail in U.S. Pat. No. 7,113,834 entitled "State Based Adaptive Feedback Feedforward PID Controller" issued Sep. 26, 2006 and U.S. Pat. No. 6,577,908 entitled "Adaptive Feedback/Feedforward PID Controller," issued Jun. 10, 2003, the entire disclosures of which are hereby expressly incorporated by reference herein.

Thus, modern control systems are being built with the ability to automatically learn about the processes that they control in order to provide adaptive tuning and controller generation. This ability to learn about the process allows the control system to react, in real-time, to changes in operating conditions and process equipment. The learning process generally begins with the collection of real-time data from the process loops and devices within the system, and this raw data is then analyzed through a set of analytical algorithms that can generate intelligent diagnostics, high fidelity process models, and improved tuning to optimize the overall control of the process. The results may be presented as recommendations to operators, may be stored in detailed evaluations, and may be used for performing adaptations in closed loop control as discussed above.

Traditionally, however, the data analysis and model generation performed for these control activities has been performed using a layered approach, wherein a third party tool retrieves the process data from the control network (directly or via the well known OPC protocol) and feeds this data to the appropriate analytical algorithms (such as process model generation and tuning parameter generation algorithms) run in workstations or third party hardware associated with the control system. A similar approach that is used in traditional process control systems, such as in a standard distributed control system (DCS), is to communicate the collected data from the control network to one or more data historians or to other workstation applications for later analysis. The problem with this layered approach, however, is that it is not very responsive, as the collection and sending of data between different devices within the process environment can take significant period of time. Moreover, this approach only allows one process loop to be evaluated at a time and generally requires significant operator intervention. Likewise, given the need for external communications between the control system and the data analysis applications, reliability and availability of the third-party analysis applications can be compromised. Given these drawbacks, it is difficult to provide timely support for multiple control loops running within a single control device when these control loops implement computationally expensive control techniques, such as adaptive control techniques and MPC techniques that require the on-line generation of process models.

SUMMARY OF THE DISCLOSURE

A process control system integrates the collection and analysis of process control data used to perform certain computationally expensive process control functions, like adaptive model generation and tuning parameter generation, in the same control device in which one or more of the process control routines are implemented, to thereby provide for faster and more efficient support of the process control routines. In particular, this system replaces the layered approach discussed above by integrating an analytical server which performs computationally expensive analyses used by one or more control routines directly into the real-time control device in which the one or more control routines are located. This integration provides the ability to analyze large quantities of data for multiple process loops controlled by a particular device in a very fast manner without compromising the integrity of the control operations.

In one embodiment, the integrated analytical server is a service that runs on the real-time control device along with the process control routines. The service directly receives the raw real-time process data from one or more control function blocks, runs one or more analytical algorithms, such as model generation algorithms and tuning parameter generation algorithms, on the data and communicates the results back to the process control routines for use in their control activities. Moreover, if desired, the analytical server may provide the analysis results to one or more workstation applications such as a database repository and a user interface application.

In order to effectively manage the central processing unit (CPU) and memory resources of the control device in which the process control routines and analytical server are implemented, the analytical server provides an interface to the real-time control routines to allow the control routines to make a call to request that an algorithm to be performed on a collection of process data. These requests may be prioritized and queued, so that the analytical server is then able to execute the requested algorithms using the collected data asynchronously with respect to the operation of control routines within the control device. Moreover, the operation of the analytical server may be isolated from the operation of the on-line control system to thereby free the on-line control to collect data for another learning iteration at the same time the current data is being analyzed by the analytical server. Once the analytical server has completed the requested operation, the generated data or results are returned to the on-line control system, i.e., to the control routines.

While the focus of this discussion is directed to an analytical server that performs the identification of process models for PID control loops or MPC routines, it should be noted that the analytical server technique disclosed herein can be applied to other control strategies and blocks including SISO/MIMO blocks, PID blocks, FLC blocks, MPC blocks, neural network (NN) control blocks, etc., as well as to any real-time process data analysis, such as model generation/update, online controller generation/update, controller tuning, fast Fourier transform (FFT) and correlation analysis, optimization, SPC, loop/device performance index generation, etc.

BRIEF DESCRIPTION OF THE DRAWINGS

For a more complete understanding of the disclosure, reference should be made to the following detailed description and accompanying drawing figures, in which like reference numerals identify like elements in the figures, and in which.

Figure 1:
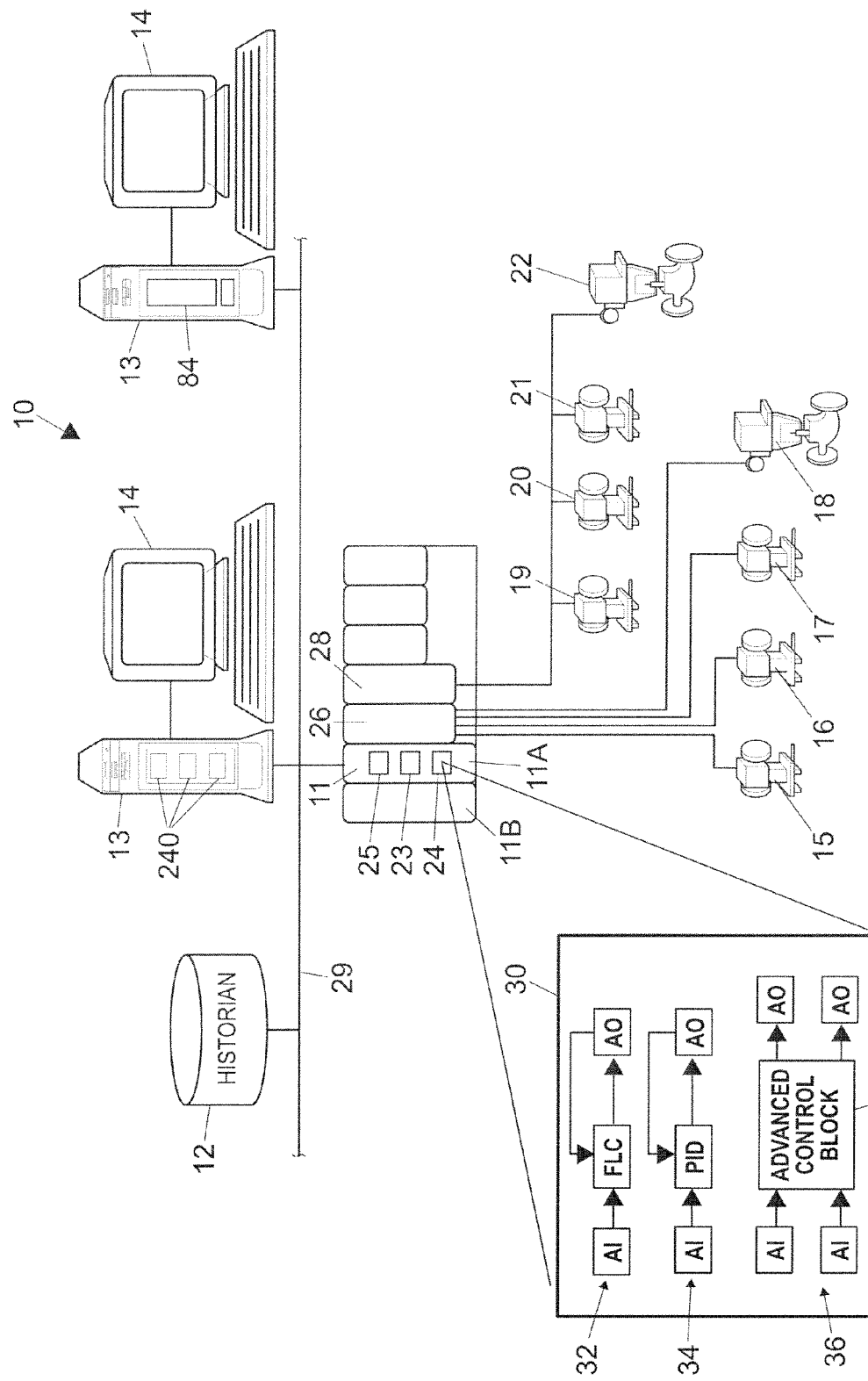
FIG. 1 is a schematic representation of a process control system including one or more control routines integrated in the same controller device as an analytical server which performs computationally expensive functions for the one or more control routines.

While the disclosed systems and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

Referring now to FIG. 1, a process control system 10 includes a process controller 11 connected to a data historian 12 and to one or more host workstations or computers 13 (which may be any type of personal computers, workstations, etc.), each having a display device 14. The controller 11, which may be a redundant controller having a primary controller 11A and a backup controller 11B, is connected to field devices 15-22 via input/output (I/O) cards 26 and 28. The data historian 12 may be any desired type of data collection unit having any desired type of memory and any desired or known software, hardware or firmware for storing data. The data historian 12 may be separate from (as illustrated in FIG. 1) or may be a part of one of the workstations 13. The controller 11, which may be, by way of example, the DeltaV™ controller sold by Emerson Process Management, is communicatively connected to the host computers 13 and to the data historian 12 via, for example, an ethernet connection 29 or any other desired communication network. The controller 11 is also communicatively connected to the field devices 15-22 using any desired hardware and software associated with, for example, standard 4-20 ma devices and/or any smart communication protocol such as the FOUNDATION Fieldbus protocol, the HART protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/I card 26 while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols developed in the future.

Each of the controllers 11A and 11B (and as specifically illustrated for the primary controller 11A) includes one or more processors 23 that implement or oversee one or more process control routines stored in a memory 24 and that communicate with the devices 15-22, the host computers 13 and the data historian 12 to control a process in any desired manner. Additionally, the controller 11A stores and implements an analytical server 25 that works in conjunction with the control routines implemented by the controller 11A in a manner described in more detail below to provide support for these control routines, including performing computationally expensive algorithms and functions, such as developing process models and tuning parameters to be used within the control routines. If desired, each of the controllers 11A and 11B may include a single processor 23 that executes both the control routines and the analytical server 25, or multiple processors 23, wherein the control routines generally execute on a first one of the processors 23 and the analytical server executes on a second one of the processors.

It should be noted that any control routines or modules described herein may have parts thereof implemented or executed by different controllers or other devices if so desired. Likewise, the control routines or modules described herein to be implemented within the process control system 10 may take any form, including software, firmware, hardware, etc. For the purpose of this disclosure, a process control module may be any part or portion of a process control system including, for example, a routine, a block or any element thereof, stored on any computer readable medium. Control routines, which may be modules or any part of a control procedure such as a subroutine, parts of a subroutine (such as lines of code), etc., may be implemented in any desired software format, such as using object oriented programming, ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

However, in one embodiment, the controller 11A may implement a control strategy using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, MPC, etc. control, or an output function which controls the operation of some device, such as a valve, to perform some physical function that manipulates a process parameter within the process control system 10. Of course, hybrid and other types of function blocks exist. Function blocks may be stored in and executed by the controller 11A, which is typically the case when these function blocks are used for, or are associated with standard 4-20 ma devices and some types of smart field devices such as HART and Fieldbus devices, or may be stored in and implemented by the field devices themselves, which may be the case with Fieldbus devices. While the description of the control system is provided herein using a function block control strategy, the disclosed techniques and system may also be implemented or designed using other conventions, such as ladder logic, sequential function charts, etc. or using any other desired programming language or paradigm.

As illustrated by the exploded block 30 of FIG. 1, the controller 11A may include a number of single loop, SISO control routines, illustrated as routines 32 and 34, and, if desired, may implement one or more advanced control loops, illustrated as a MIMO control loop 36. Each such control loop is typically referred to as a control module. The single-loop control modules 32 and 34 are illustrated as performing single loop control using a single-input/single-output fuzzy logic control (FLC) block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having multiple inputs communicatively connected to multiple AI function blocks and having multiple outputs communicatively connected to multiple AO function blocks, although the inputs and outputs of the advanced control block 38 may be connected to any other desired function blocks or control elements to receive other types of inputs and to provide other types of control outputs. The advanced control block 38 may be any type of model predictive control (MPC) block, neural network modeling or control block, a multi-variable fuzzy logic control block, a real-time-optimizer block, etc. It will be understood that the function blocks illustrated in FIG. 1, including the advanced control block 38, can be executed by the controller 11A and, additionally, a copy of these routines can be located in the redundant controller device 11B to be executed by the redundant controller device 11B when the primary controller device 11A fails.

Figure 2:
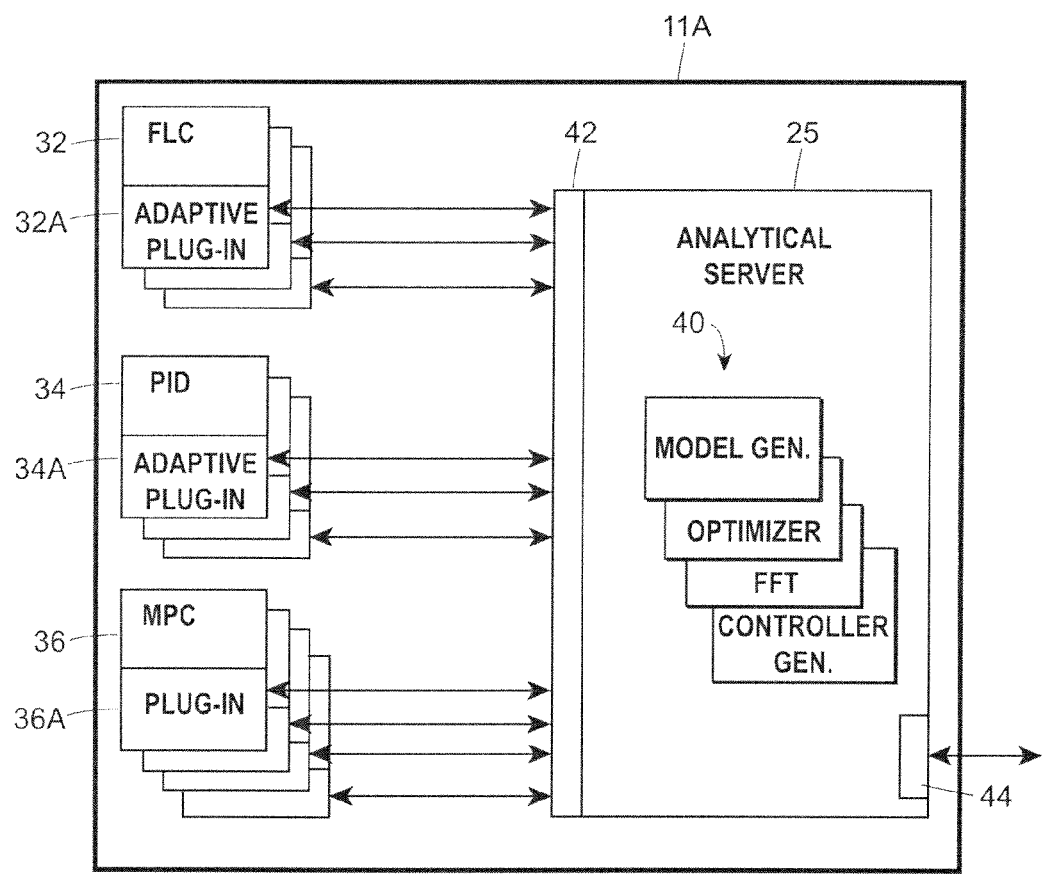
FIG. 2 is a schematic representation of the controller of FIG. 1 including an analytical server in communication with a number of control function blocks performing on-line or real-time control.

With reference now to FIG. 2, the controller 11A may have any number of control modules 32, 34 and 36 that define and implement corresponding process control routines to perform on-line or real-time control of a process. The implementation of these control modules is typically referred to as the on-line process control subsystem. Thus, the control modules 32, 34 and 36 may be implemented in connection with an on-line operational environment and are generally associated with the normal, scheduled control of the process. As described above, each of the control modules 32, 34, 36, may have any number of function blocks, including control function blocks, associated therewith.

The control modules stored within the controller device 11A are generally shown in FIG. 2 as including a number of different adaptive fuzzy logic control (FLC) modules 32, a number of different of adaptive PID control modules 34 and a number of different MPC control modules 36. In this case, each of the control modules 32, 34, and 36 is shown as a standard control module, such as a FLC, a PID or an MPC control module, provided with an adaptive plug-in module 32A, 34A or 36A, wherein each of the plug-in modules 32A, 34A or 36A operates to perform adaptation activities with respect to its associated control module and/or to provide an interface between the associated control module and the analytical server 25 so as to implement communications between the functions blocks, such as FLC function blocks 32, the PID function blocks 34, and the MPC function blocks 36, and the analytical server 25. Generally speaking, the plug-in modules 32A, 34A are provided to convert the standard FLC and PID control modules 32 and 34 into adaptive FLC and adaptive PID control modules using the analytical server 25 to perform certain computationally expensive algorithms associated with these adaptive control activities. Likewise, the plug-in modules 36A are provided to enable the MPC control routines 36 to communicate with the analytical server 25 to perform model generation and controller generation with respect to the MPC routine. If the control modules 32, 34 and 36 are executed on the same processor as the analytical server 25, then the modules 32, 34 and 36 and the server 25 may communicate with each other using a common processor buffer. However, if the control modules 32, 34 and 36 are executed on a different processor within the controller 11A, as the analytical server 25, then any known or desired inter-processor communications may be used to implement the communications between the control modules 32, 34 and 36 and the analytical server 25.

In any event, as specifically illustrated in FIG. 2, the analytical server 25 is integrated within the process controller device 11A to enable direct communications with each of the control routines 32, 34 and 36 implemented within the process controller device 11A. As a result, the analytical server 25 is able to receive real-time process data collected by the control blocks 32, 34 and 36 directly, i.e., without having to communicate that data over an external communication network. Upon receiving the raw process data and/or a request to implement a support function for one of the control routines 32, 34 and 36, the analytical server 25 executes one or more analytical algorithms 40 using the collected process data and then provides the results of the performed analyses back to the control blocks 32, 34 and 36, as well as to other process components such as workstation applications, database repositories and user interface applications located exterior to the controller device 11A.

As shown in FIG. 2, the analytical server 25 may include any number of algorithms or routines 40 that may be used to support the operation of the control routines 32, 34 and 36. As an example only, the algorithms 40 may be related to developing or generating process models that model the operation of the process 10, generating one or more tuning parameters for a control routine based on, for example, a process model, providing other adaptation functions, implementing non-linear, parametric and non-parametric algorithms, performing MPC controller generation functions, performing controller optimization functions, performing FFT and/or correlation analyses, etc. Moreover, the algorithms 40 implemented by the integrated analytical server 25 may be used to support any type of process control techniques and blocks, including SISO and MIMO process control modules.

In one embodiment, the analytical server 25 includes an interface 42 which is used to communicate within the controller 11A to the various control blocks 32, 34 and 36 so as to receive calls and process data from the control blocks 32, 34 and 36 as well as to send analysis results back to the control blocks 32, 34 and 36. Additionally, the analytical server 25 includes an exterior interface 44 which may be used to provide communications with external devices, such as user interfaces, data historians, etc.

The analytical server 25 is particularly well suited to perform computationally expensive algorithms that support, or are necessary for the operation of the control modules 32, 34 and 36, but that may not need to be run during each execution period of the control modules 32, 34 and 36. Thus, for example, the adaptive, model-based control techniques described in U.S. Pat. Nos. 6,577,908 and 7,113,834 require process model regeneration to perform the adaptive tuning. While the computationally expensive process model regeneration techniques used to develop various process models for different regions or states of the process need to be performed for this adaptation, anew process model typically does not need to be recalculated during every execution cycle of the PID control routine. Thus, the process model and tuning parameter generation techniques described in U.S. Pat. Nos. 6,577,908 and 7,113,834 may be implemented by the analytical server 25 only when a need for a new process model is recognized by a control module.

As noted above, in one embodiment, the analytical server 25 may operate to execute one or more model generation routines, which generate process models to be used by various ones of the adaptive control routines 32 and 34 in performing adaptive control or to be used by the MPC control routines 36 to implement MPC model or controller regeneration. In a similar manner, the analytical server 25 may calculate one or more adaptive tuning parameters based on one or more generated process models and may send these tuning parameters to the control blocks 32, 34 and 36. Of course, as noted above, the analytical server 25 may store and implement other analytical algorithms (besides model and tuning parameter generation algorithms) for one or more of the control blocks 32, 34 and 36 and can support the model generation needs of different types of control blocks besides the FLC, PID and MPC control blocks illustrated in FIG. 2.

More particularly, the analytical server 25 operates by implementing a client/server communication relationship with respect to the various control blocks 32, 34 and 36, and thus may be called by any or all of the individual control blocks 32, 34 and 36 at any time those control blocks need to implement one of the algorithms 40 stored within the analytical server 25. Thus, when the analytical server 25 stores and implements a process model generation or a tuning parameter generation algorithm, any or all of the control blocks 32, 34 and 36 may place a call to the analytical server 25 to have the server 25 implement the appropriate model generation or tuning parameter determination algorithm 40 to calculate a new process model for use by the control block (or to calculate new tuning parameters for the control block). Because the analytical server 25 is disposed within the same physical control device as the process control modules 32, 34 and 36, no exterior communications need to occur for the analytical server 25 to receive the raw process data needed to generate the process models, which increases the amount of data and the speed at which process data can be provided to the analytical server 25 as compared to algorithms executed in different devices, such as in the user interfaces 13 of FIG. 1. In any event, the analytical server 25 may operate based on the calls thereto provided by the various control modules 32, 34 and 36 to perform the requested analytical processes, and then return analysis data (such as a new process model) back to the individual control blocks 32, 34 and 36 to thereby provide computation services needed for those control blocks to perform, for example, adaptive control or MPC controller regeneration.

It is preferable that the analytical server 25 execute asynchronously with respect to the control blocks 32, 34 and 36 (and therefore asynchronously with respect to the on-line or real-time control system), so that the operation of the analytical server 25 does not affect operation of the control modules 32, 34 and 36 in any manner, especially when the analytical server 25 is executed in the same processor as the control modules 32, 34 and 36. More particularly, the analytical server 25 may be operated within the controller device 11A to assure that its execution does not affect or cut into the processing time needed to implement the various control modules 32, 34 and 36. Instead, the analytical server 25 uses processing time or processing power of the processor within the controller device 11A that would normally be left unused by the control routines 32, 34 and 36. Put another way, the processor of the controller device 11A prioritizes the operation and execution of the control routines 32, 34 and 36 above the operation of the analytical server 25 (whether these components are executed the same processor or on different processors) to assure that the control routines are implemented on a predetermined schedule and that these routines are given the processing power or time needed to perform ongoing process control activities. The controller device 11A then executes the analytical server 25 at times or using processing power not needed to fully implement the control routines 32, 34 and 36.

As the analytical server 25 operates at a lower overall priority within the controller device 11A than the control routines 32, 34 and 36, the analytical server 25 may prioritize each of the calls from the control routines 32, 34 and 36, and may implement or execute the calls according to the determined priority. The priority of a call may be based on information within the call, such as an indication of a priority sent from the control routine that is making the call, based on the relative importance of the different types of calls, based on the relative importance of the different types of control blocks making the calls, based on the relative importance of different control blocks of the same type making a call, or based on any other preset priority factor(s). Thus, the analytical server 25 may operate to provide services for a control block with a higher level of priority before providing services for a control block with a lower level priority when a call is received from each of such control blocks. Likewise, the control blocks themselves may provide an indication of the priority of the call within the call itself based on information determined by the control blocks. In any event, the analytical server 25 executes the algorithms 40 stored therein based on the calls and data provided to the analytical server 25 by the individual or different control routines 32, 34 and 36 within the controller 11A, and provides the results of the algorithms back to the control routines 32, 34 and 36. In this manner, the execution of the various algorithms 40 for the various different calls is performed by the analytical server 25 in a manner that is isolated from the rest of the on-line control system, which allows the on-line control system (e.g., the individual control routines) to collect data for a future learning iteration at the same time that data associated with the current learning iteration is being processed by the analytical server 25. Likewise, this isolated operation of the server 25 allows the analytical server 25 to process calls from different control blocks at the same time.

Once the analytical server 25 has completed a requested operation, the generated control data (e.g., a process model) is returned to the on-line control system (e.g., the requesting control block 32, 34 or 36) via the interface 42 and the appropriate plug-in module 32A, 34A or 36A. Of course, the analytical server 25 may also be configured or constructed to serve the generated data to an exterior device via the interface 44, such as an external server, to another application such as a diagnostics application, a user interface application, etc. executed within a different device, to a database repository located in another device, etc.

Figure 3:
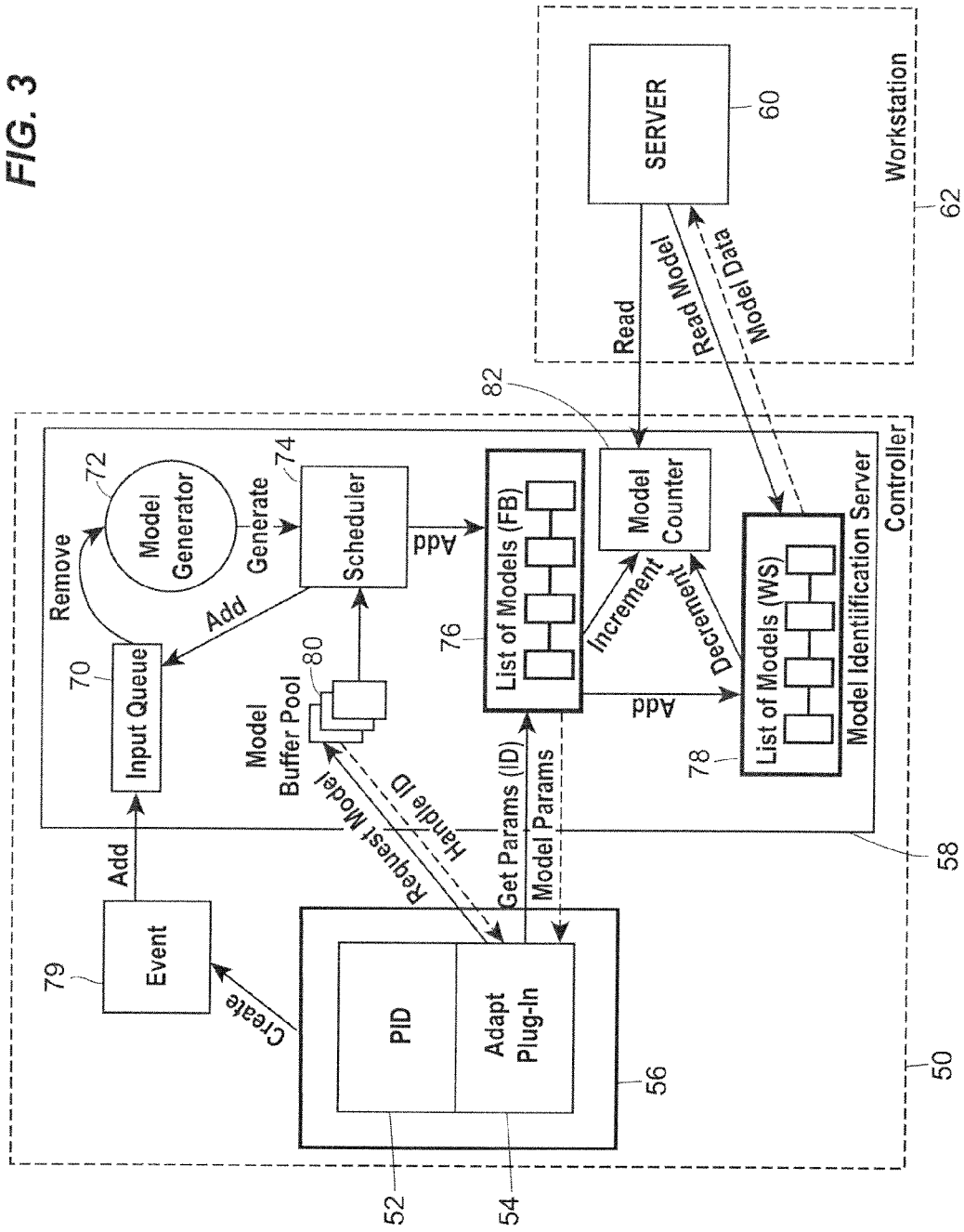
FIG. 3 is a schematic representation of the controller of FIG. 1 in communication with a workstation, and in which the analytical server is used to generate one or more process models for an adaptive PID control routine.

FIG. 3 illustrates a controller 50 that stores a particular example of an analytical server 58 used in conjunction with an adaptive PID control routine 56, such that the analytical server 58 provides model identification and generation services to the adaptive PID control routine 56. In particular, as shown in FIG. 3, the adaptive PID control module 56 includes a PID control routine 52 having an adaptive tuner plug-in module 54 connected thereto. As also illustrated in FIG. 3, the analytical server 58 includes a model generation algorithm that is used to provide computational support for the adaptive PID control module 56. The analytical server 58 is, additionally, communicatively coupled to an external server 60 which may be located in a workstation or other device 62. If desired, the device 62 may be the historian 12 of FIG. 1, one of the user interface devices 13 of FIG. 1, or some other device.

The analytical server 58 is illustrated in FIG. 3 as a model identification server including an input queue 70, a model generator algorithm 72, a scheduler block 74 and multiple model storage blocks 76 and 78 which may be used to store process models created for various different control blocks within the controller 50. During operation, the adaptive PID control module 56 may perform adaptation for the PID control module 56 using an adaptive process that requires periodic model generation, such as the technique described in more detail in U.S. Pat. Nos. 6,577,908 and 7,113,834. While implementing this technique, the adaptive PID control module 56 collects process data indicative of the operation of the process. When the PID control module 56, and particularly the plug-in block 54, recognizes that the process has entered into a different state, and thus that adaptation using a new process model is required or needed (or recognizes some other triggering event requiring the generation of a new process model), the adaptive plug-in block 54 may send a call to the analytical server 58 to institute a model generation technique using the collected process data. As part of this call, which may be provided by the control block 56 using a triggering event call 79 to the input queue 70, the adaptive plug-in 54 may provide a priority indication as well as an appropriate amount of collected process data to the analytical server 58, which the analytical server 58 uses to generate a new process model. The call requesting an updated model, as well as the process data needed to generate the new model, may be provided to the input queue 70 and/or to a model buffer pool 80 which is part of the analytical server 58. Of course, the adaptive PID control module 56 (as well as other control modules within the controller 50) may send a call to the analytical server 58 at any time. Moreover, because the analytical server 58 operates asynchronously with respect to the control module 56, the analytical server 58 may operate on multiple calls from the same control module or from different control modules at the same time.

In any event, the scheduler block 74 within the analytical server 58 analyzes the requests or calls within the buffer pool 80 and/or the event queue and places or orders these requests on the input queue 70 based on the priority information associated with the different calls. Of course, the priority of a call or a request may be based on the actual identity of the control block or the type of control block making the request (as some types of control blocks or some particular control blocks may have a higher priority than others based on the importance of these control blocks to the operation of the process), based on priority information provided by a user at some time, and/or based on priorities provided by the control blocks making the individual requests. Thus, as noted above, a control block may prioritize a call or a request for a model generation based on information available to the control module. In one example, the PID control module 56 may recognize that it needs to be updated more quickly when a significant change occurs within the state of the process, and in this case may generate a call for a model update having a higher priority, then when only a minor change occurs within the state of the process.

The model generator 72 processes the calls in the order in which these calls are found on the input queue 70, and operates to implement one or more model generation algorithms to generate models and/or other tuning parameters pursuant to the calls. The generated model (and associated tuning parameters if desired) are then provided to the scheduler block 74 which provides the newly generated model to the model storage blocks 76 and 78. Once a model has been placed in the storage block 76, this model (or the tuning parameters associated with this model) may be then provided back to the control module 56, and in particular, to the adaptive plug-in module 54, which then uses this updated model to perform adaptive control for the PID control block 52. The request for a new model as well as the information about a newly generated model may be tracked in the communications between the control block 56 and the analytical server 58 using IDs such as handle IDs and parameter IDs, as illustrated in FIG. 3. Of course, if desired, the control module 56 may make further calls to the analytical server 58 to implement further procedures needed to perform adaptive control using the newly created process model.

If desired, the model data stores 76 and 78 may be used to store and track the models generated for a particular control routine or for a particular portion of the process. In one example, the model data store 76 is used to store models and parameters for the control module 56 (as well as other control modules within the controller 50), while the model data store 78 may be used to be provide the generated models to the server 60, to a user workstation or to another external application. In particular, a model, once created or generated may first be stored in the model data store 76 and from there may be provided back to the control routine 56 which caused the creation of this model. The database 76 may additionally store previously generated models for the control routine 56. Upon receiving a model, the control routine 56 (or a user who has access to the model) may wish to purge the model as not being accurate. In this case the control module 56 may send a message to analytical server 25 to cause the model to be deleted or purged from the model database 76.

On the other hand, the model database 78 may be used to reflect the models stored in the data store 76 for the purpose of providing a copy of the created models to applications or historians executed in other devices. In this case, the model storage 78 may act to mirror the set of models within the database 76, but may track which models have been sent to an exterior device for permanent storage, such as an exterior historian which may store the models in a more persistent manner. If desired, a model counter 82 may be used to track the number of models which have been created and copied to the model storage 78, but which have not yet been sent to the exterior device, such as the workstation 62 for persistent storage. In any event, the model database 78 may operate as a temporary model store which may be used to serve generated models as well as other information to external devices.

As will be understood from the configuration of FIG. 3, the analytical server 58 may perform model generation and storage as well as the development of tuning parameters based on developed models in response to requests or calls made by control module 56 (as well as other control modules within the controller 50). In one example, the analytical server 58 operates independently of the control module 56 without effecting or cutting into the processing time or schedule of the control module 56, so that the control module 56 operates at the same speed (period) regardless of whether the analytical server 58 exists or is operating to process data. In other words, the analytical server 58 is specifically configured to operate only using processor resources not being used by the actual control routine 56 so as to not slow down or interfere with the actual operations of the control routine 56. In this manner, the analytical server 58 is integrated with the control routine 56 in the controller device 50, but does not slow down or interfere with critical operations of the control routine 56.

As will be understood, the integrated analytical server 58 dynamically operates on real-time process data to perform any desired analytical and learning algorithms without user intervention, and thus can operate automatically, if so desired. Still further, the analytical server 58, as described herein, provides a mechanism to perform computationally intensive algorithms on process data and control data without compromising time critical control performed by the control routines within the controller 50, thus enabling fast and efficient adaptive tuning as well as other functions to be performed within a controller device. In one example, the integrated analytical server 58 allows for multiple learning iterations to be performed at the same time for a particular process control loop. Thus, the analytical server 58 may simultaneously operate on calls or requests for the same process control loop for different periods of time (i.e., for different sets of collected process data) so as create different process models for different regions of the process at the same time. Still further, the integrated analytical server 58 enables multiple process analyses to be in progress for different control routines implemented by a particular process control device at the same time. Thus, the analytical server 58 may simultaneously provide services for more than one process control routine to generate models or tuning parameters or other information for those different process control routines.

Of course, the output of analytical server 58 (i.e., the controller data generated by the analytical server 58) while being provided to the control routines within the controller 50 can also be provided to other devices such as user applications and database repositories for any desired use. Still further, the analytical server 58 may interface directly with a user, such as a user using an interface application 84 within one of the workstations 13 of FIG. 1. In this manner, the user interface 84 may be used to read data (such as generated models) from the analytical server 58, may be used to change or update one or more of the algorithms implemented by the analytical server 58, to purge or alter the input queue 70, to provide priority information to the analytical server 58 so as to effect the manner in which the scheduler 74 schedules requests or calls on the input queue 70, to flush the stored process models in the model storage 76 or 78, etc.

As noted above, while FIG. 3 illustrates a particular analytical server 58 that implements a model identification technique for use with an adaptive PID control routine, the concept of placing an analytical server within the same control device as the control routines which use the services of the server is applicable in other control routine activities including, for example, providing optimization services for a control block, such as an MPC control block, generating models such as MPC models used by an MPC controller based on data collected from a process, performing correlation analysis, generating Fourier transforms on process data, etc. In all cases, it will be understood that the control routine may simply call the analytical server within the same controller device to perform a desired algorithm, and the server device may implement these algorithms asynchronously with respect to the control routine operation to assure that the control operation is not slowed or hampered by the execution of the analytical server. Still further, it is best if the analytical server is used to perform computational activities that do not generally need to be performed during every execution of a particular control routine, as the analytical server may otherwise become overloaded, especially if the control routine and the analytical server are executed on the same processor. In this case, a control routine will generally make calls to the analytical server at a rate that is less than once for every execution period of the control routine within the controller device.

While the operation of the integrated analytical servers described herein is described in conjunction with a primary control device, such as the primary controller 11A of FIG. 1, the analytical server may also be run in redundant control devices with power-fail restart capabilities. To effect this operation, the redundant analytical servers within the redundant control devices (i.e., the servers within the primary and backup controllers of the redundant pair of controllers) will communicate with each other during normal operation of the process to thereby share the ongoing operational data (such as call and request data, process model data, etc.) that may be needed by the redundant controller to implement the operations of the analytical server when the primary controller fails.

Figure 4:
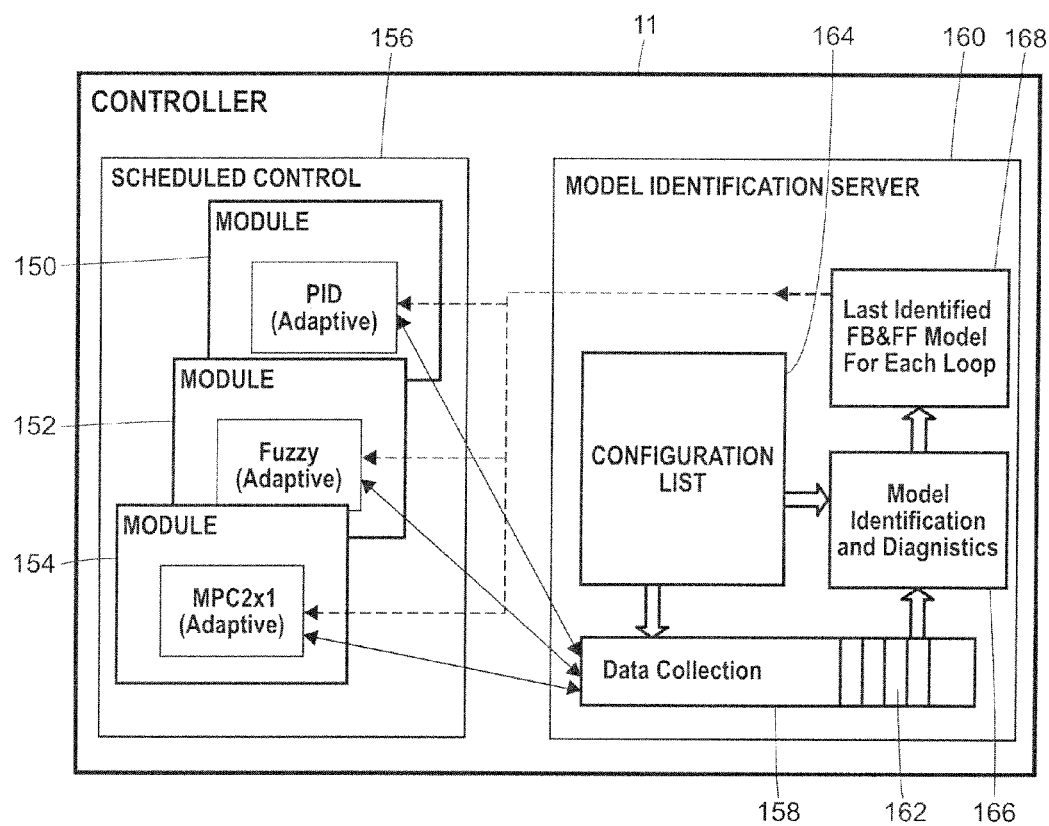
FIG. 4 is a schematic representation of another controller having multiple control routines communicatively connected to an analytical server disposed therein.

Another example of the use of an analytical server within a controller device that implements process control routines will now be described with reference to FIG. 4. In particular, the controller 11 of FIG. 4 is shown as having any desired number of control modules 150, 152, and 154 that define and implement corresponding process control routines to control the on-line process, with the group of control modules 150, 152 and 154 defining the on-line control system 156. Thus, the control modules 150, 152 and 154 may be implemented in connection with an operational control environment 156 and may generally be associated with normal, scheduled control of the process. While not specifically shown in FIG. 4, each of the control modules 150, 152 and 154 may have any number of function blocks, including control function blocks.

In accordance with some embodiments of the disclosed technique, parameter values and other operating condition data are passed from the control modules 150, 152 and 154 to a data collection function 158 of an analytical server 160 that implements a model identification routine. Generally speaking, the parameter values and other process operating condition data are made available (or otherwise communicated) during execution of the control modules 150, 152 and 154 and the function blocks thereof to the server 160. Because the execution of the control modules 150, 152 and 156 is continuous during the scheduled process control activities, the communication of the parameter values and other operating condition data to the server 160 may also be continuous, or may be provided with one or more calls to the server 160 in the manner described above with respect to FIG. 3.

The data collection function 158 of the analytical server 160 may be implemented, but need not be implemented in object-oriented fashion as an object(s) (or object entity). Regardless of its structure, the data collection function 158 may include one or more routines defining the procedures to be implemented in the data collection, including any data handling procedures. The routines of the data collection function 158 may thus coordinate, support or implement the storage of the collected data in, for instance, one or more registers 162 or other memories. The procedures executed by the data collection function 158 may include determining when to collect the data from the control modules 150, 152 and 154, as described below.

More generally, the data collection function 158 may include one or more routines to support the automatic collection, gathering, receipt or other handling of the parameters and other operating condition data. To the extent that the automatic collection or other handling of the parameters and data is implemented by the data collection function 158, less computational requirements are placed on the on-line control system 156, the control modules 150, 152 and 154, and any control blocks thereof. As a result of such separation of the model identification procedure (as performed by the analytical server 160) from the control function blocks, the function block memory and execution requirements will be the same whether model identification is enabled or disabled. Furthermore, the number of parameters and associated memory requirements added to the control blocks to support adaptation (i.e., adaptive control) is minimized.

The separation of the on-line control system 156 and the analytical server 160 also allows some embodiments to provide an option to disable the analytical server 160 or components thereof such as the data collection function 158. Disabling model identification may be useful if, for instance, it is determined that the controller 11 has insufficient memory or time for the calculations and other processing. On a related note, the use of the identified models to provide adaptive control may be also be enabled or disabled on a loop, area, system or controller basis.

Separate model identification functionality also supports the coordination of process input changes. Such coordination is made possible because model identification within the controller 11 is centralized in one process. For example, when no set point changes are being made, the model identification implemented by the analytical server 160 (or other element or routine) may automatically inject changes in the controller output. These changes may be coordinated in a manner to minimize the impact on process operation. These changes may thus be distributed over time.

Separate model identification also means that the processing of data for model identification may be performed in free or down time for the controller 11, or at any other time deemed suitable by the controller 11. As a result, the implementation of model identification processing avoids adversely impacting scheduled control functionality provided by, for instance, the on-line control system 156. Thus, in some embodiments, the model identification procedure implement by the server 160 may be implemented by the controller 11 in the background, while the process is on-line, and at strategically advantageous times during the scheduled control and other activities undertaken by other modules or components of the controller 11.

In some embodiments, the parameter data and other data is passed from the control modules 150, 152 and 154 to the data collection function 158 automatically whenever a control block executes. In this sense, the data collection function 158 may be implemented continuously to support the data collection procedure at any time during operation of the process. During those times when control is not scheduled to execute, the data collection function 158 may then examine the collected data to determine if a process model should be generated (e.g., created or identified). In alternative embodiments, the controller 11 may examine or otherwise process the collected data periodically or in some other scheduled manner.

The data collected by the data collection function 158 may generally include values for the process inputs and outputs or the operating set point for a particular control loop implemented by the controller 11 (or, more generally, the process control system 10). For each of these parameters, values are collected and stored over a time period beginning before a trigger event and lasting until steady state is reached. In some cases, the trigger event may involve the detection by, for instance, the data collection function 158 of a change in the process input or set point.

In some cases, what constitutes a trigger event may depend on the operational mode of the control loop. When a control loop resides in an "automatic" mode of operation, the loop is continuously adjusting the controller output (i.e., the manipulated process input) to maintain a process output (i.e., the controlled parameter of the loop) at an operator-specified set point. Thus, in automatic mode, a change in the set point will constitute a trigger to analyze the change in process inputs and outputs and, thus, to develop a model. If the operator never (or rarely) changes the set point and the loop remains in automatic mode, then a small change may be injected in the controller output so that there is a trigger to create a model.

When the loop resides in a "manual" mode, then the controller output is set by the operator, i.e. the control algorithm is not adjusting the output. Thus, in manual mode, a change in the output introduced by the operator constitutes a trigger for analyzing process inputs and output to obtain a model. The above-described trigger events may be used for the development of feedback models. For feedforward model identification, the trigger event may be a change in the feedforward input value.

Once the trigger event is detected, the on-line control system 156 and the data collection function 158 communicate in any desired fashion to support the data collection. In some embodiments, the data collection is facilitated by the control system 156, which may also indicate the detection of a trigger event. More specifically, the control loops implemented by the control modules 150, 152 and 154 may continuously provide access to the data or otherwise make the data available. As a result, data collected for some time before the trigger event may also be analyzed to determine the process model. For example, a PID control loop for which data is collected may provide access to the current data values for the process variable used in the block execution (e.g., PV), the block output value (e.g., OUT), the feedforward control input value (e.g., FF_VAL), the set point, and any one or more parameters that indicate the loop mode of operation. In some cases, the data collection function 158 may facilitate the selection of the parameter or other data values. Alternatively or in addition, the analytical server 160 implementing the model identification algorithm may include a configuration list block(s) 164 that determines which parameters need to be collected. To that end, the configuration list block 164 may include a memory or other storage mechanism for the list data. Stored along with the identified parameters may be a list or other identification of the control blocks or modules for which the models are to be generated.

At some point following the data collection associated with a trigger event, the analytical server 160 may implement a model identification algorithm or calculation routine 166. The model calculation routine 166 may also analyze the calculated models in addition to merely performing the calculations. Such analysis may involve process and/or control diagnostics to determine, among other things, the quality of the model. The calculated models may then be passed along to a storage or other block 168 that holds the last identified model(s) for each control loop. In some cases, a control loop may have two models stored to support, for instance, both feedback and feedforward control. As shown in FIG. 4, the calculated models are passed to the block 168 after and depending on the quality of the model as determined by the model diagnostics of the routine 166.

The quality of the model may also be determinative of whether the model is passed along to the control function blocks of the control modules 150, 152 and 154. In the exemplary embodiment of FIG. 4, each of the control modules 150, 152 and 154 incorporates at least one control loop having adaptive control and, accordingly, receives process models from the model identification routine implemented by the analytical server 160 as shown. However, the models calculated and otherwise identified by the disclosed technique may be processed and provided based on the aforementioned model quality determined by the block 166 and, in some cases, on the operational state of the control function block receiving the new model.

Figure 5:
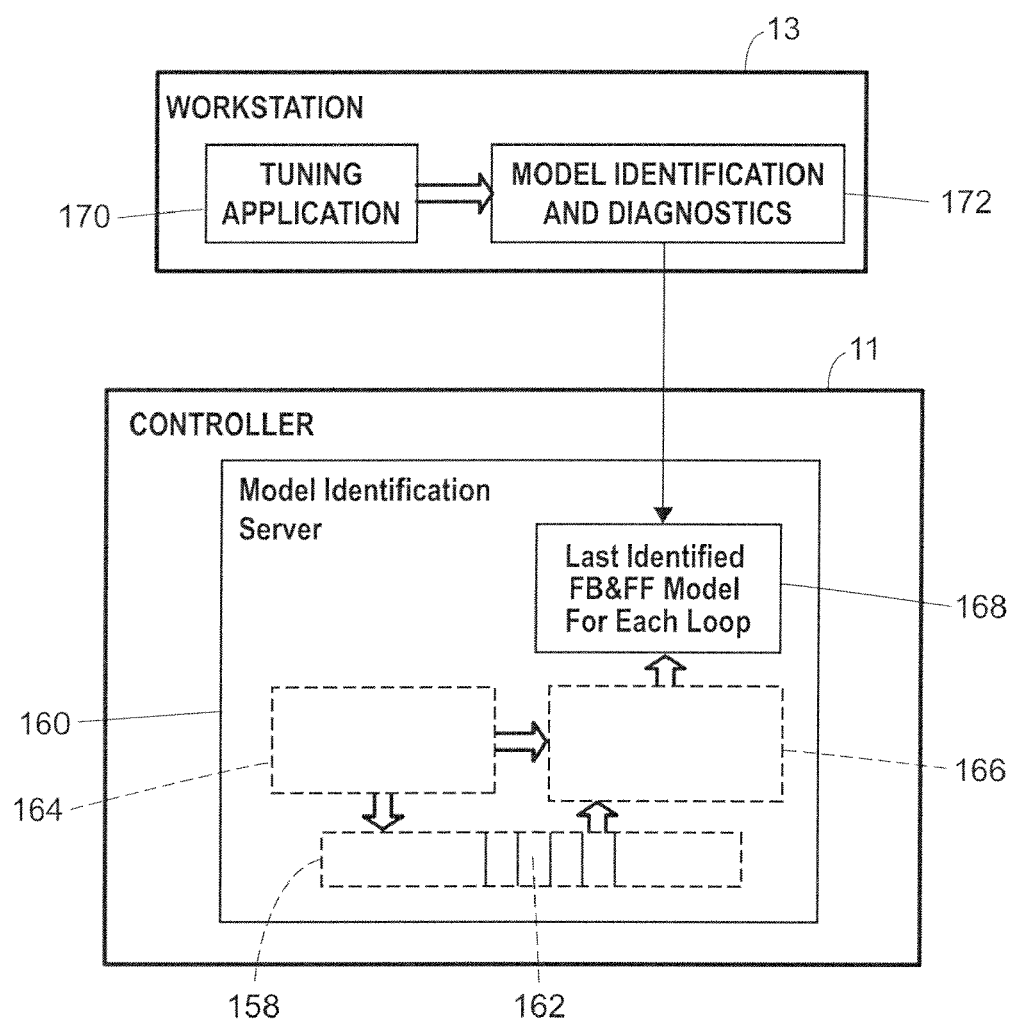
FIG. 5 is a schematic representation of a controller having an analytical server disposed therein in communication with an external device in the form of a workstation.

With reference now to FIG. 5, a user of one of the workstations 13 may initiate the creation of a process model by selecting real-time or historical data provided via a tuning or other application 170 implemented on the workstation 13. Such user-initiated process model creation may be in addition to the processing described in connection with FIG. 4. In fact, in the exemplary embodiment shown in FIG. 5, the controller 11 to which the model created by the tuning application 170 is passed also includes the analytical server 160 and its constituent parts, i.e., the data collection function 158, the model calculation routine 166, etc.

Apart from the source of the parameter values and other operating condition data used to create the process model, the workstation 13 may implement the same or similar steps toward creation of the process model. For instance, the workstation 13 may include a model calculation and diagnostics module or block 172 similar to the block 166 of the controller 11. The model calculation block 172 may accordingly determine the quality and other aspects of the created block prior to, or in connection with, passing the block to the controller 11 and the storage block 168, as shown.

In some embodiments, the workstation 13 may have additional or alternative applications that provide similar functionality. In one case, the other application may provide one or more display interfaces that support the analysis and/or inspection of the process models identified via the disclosed techniques. In connection with the generation of the additional process models, however, these workstation applications may generate a trend window or display interface that provides an opportunity to select process data for use in the model creation. Using these trend windows or other interfaces, a user may select the data, including the time window. In these cases, the time to steady state may accordingly be determined via the time window selected by the user. Alternative embodiments may provide other mechanisms for manually or automatically selecting the time window.

As described above, practice of the disclosed technique is not limited to systems implementing adaptive control routines. However, the identification of process models via the disclosed techniques may be utilized to support such routines, when desired.

Figure 6:
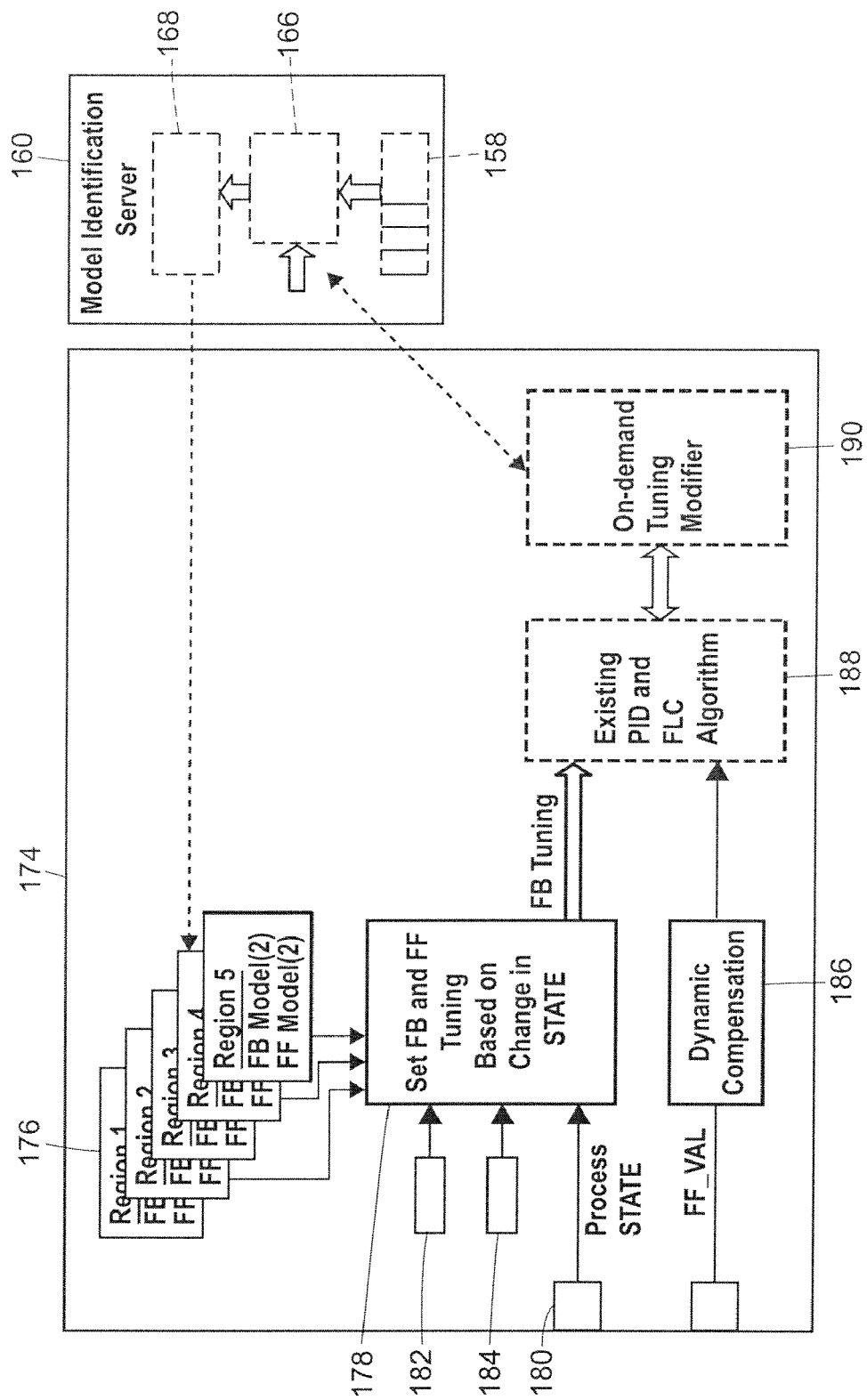
FIG. 6 is a schematic representation of an adaptive control function block within the controller of FIG. 4 in communication with an integrated analytical server, in which the adaptive control function block modifies tuning in accordance with stored models and operational state information developed by the analytical server.

As shown in FIG. 6, an adaptive control function block 174 for use in connection with the disclosed technique may include one or memories or other storage mechanisms 176 to save or store a predetermined number (e.g., five) of process models that have been identified as described above. In operation, one of the process models stored in the memory 176 may then be selected for use via a logic block 178 responsive to one or more parameters. In the exemplary embodiment of FIG. 6, the block 178 selects the process model based on a selected or otherwise determined process state parameter provided via an input 180. Two other parameters 182 and 184 may also be relied upon for the determination, and may correspond with feedback and/or feedforward rules or a setting that allows the operational state to adapt to changing conditions.

The process models for the function block 174 may, but need not, be associated with operational regions (e.g., Region 1, Region 2, etc., as shown). The process models may also be identified in pairs in accordance with the control scheme of the function block. In this exemplary case, each region is determinative of a pair of process models in support of both feedback and feedforward processing. Upon selection of the region, the pair of feedback and feedforward models may be utilized by the block 178 to calculate feedback and feedforward tuning parameters, respectively. In the exemplary case shown in FIG. 6, the feedforward tuning parameters are provided to a dynamic compensation block 188 also responsive to a feedforward control input value (e.g., FF_VAL) for, e.g., dead time and lead/lag dynamic compensation. The results of the dynamic compensation, along with the feedback tuning parameters, may be passed to a block or routine 188 responsible for the implementation of the control algorithms for the function block. In this case, the feedback and feedforward parameters modify PID and fuzzy logic algorithms, but any control schemes, or control scheme combinations, may be utilized.

The function block 174 also includes a block or routine 190 to support on-demand modifications of the control loop tuning. To this end, the block 190 may be responsive to a user command entered via the controller 11, the workstation 13 or any other element of, or device in communication with, the process control system 10. In general, the model that has been automatically identified for the loop may, on demand, be used with a selected tuning rule to set the loop tuning. If a model has not previously been identified, then a user command may initiate a relay oscillation or other technique to inject changes in the controller output. The resulting process model developed from the process response to the change in controller output may then be used with a selected tuning rule to set the loop tuning or to provide tuning recommendations.

In some cases, the process models generated via the block 190 or as a result of a triggering event (e.g., a set point or other parameter value change) may first be held for viewing before a download to the controller 11 or function block 174. For example, such models may be classified as "unapproved models" until analysis via a user interface has provided approval for implementation. In some embodiments, such approval may alternatively or additionally be provided automatically via diagnostic or other functionality in the controller 11 or workstation 13.

Figure 7:
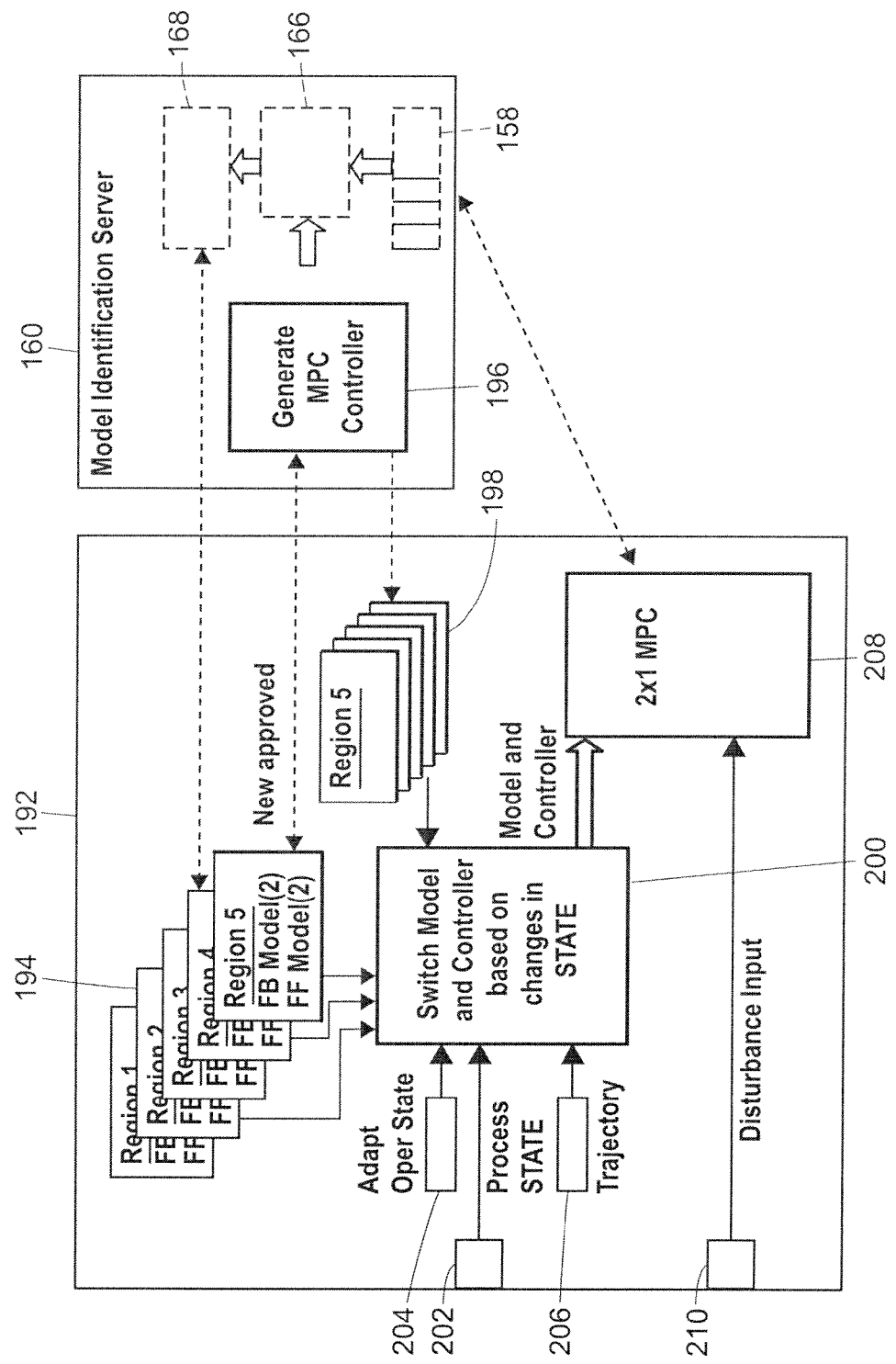
FIG. 7 is a schematic representation of an adaptive MPC function block and an analytical server of the controller of FIG. 4 in which the MPC function block implements on-demand testing for model identification using the analytical server.

FIG. 7 shows an adaptive block framework in the context of an adaptive MPC control block 192 in which a number of different operational regions are also supported. In this context, a plurality of process models identified via the model identification routine implemented by the analytical server 160 may still be passed to a memory or storage 194 (similar to the memory 176 of FIG. 6) as shown, but the model parameters may be processed by an MPC controller generation routine 196 prior to implementation in the function block 192. More specifically, the routine 196 may generate a corresponding MPC controller for storage in a memory 198 based on the identified models. A logic block 200 may then select or switch between the models that are used to generate the MPC controller based on changes in a state parameter and other parameters provided via inputs or memories 202, 204 and 206, as shown.

The MPC controller associated with the selected process model may then be provided to an MPC controller block 208 for implementation in the on-line process. The MPC controller block 208 may support automated on-demand testing of the selected MPC controller, which may be initiated by the introduction of a disturbance input 210 or otherwise, as desired.

In some cases, the exemplary adaptive control function blocks shown in FIGS. 6 and 7 (as well as other blocks for use with the disclosed technique) generally support three modes of operation: a learn mode, a schedule mode and an adaptive mode. In the learn mode, process models may be collected but are not automatically used to determine the loop tuning. In the schedule mode, new process models may be collected and those models that are approved will be automatically used to determine loop tuning parameters. In the case of an adaptive MPC block, such approved and applied models will then be used in control generation in accordance with the current operating region, as the controllers will be automatically switching with the current operating region. In the adaptive mode, process models are collected, automatically approved and then automatically used to determine loop tuning parameters. While the default setting for each function block may be the learn mode, the display interfaces provided via, for instance, one of the applications implemented on the workstations 13 may provide an opportunity to change the setting, as desired.

Figure 8:
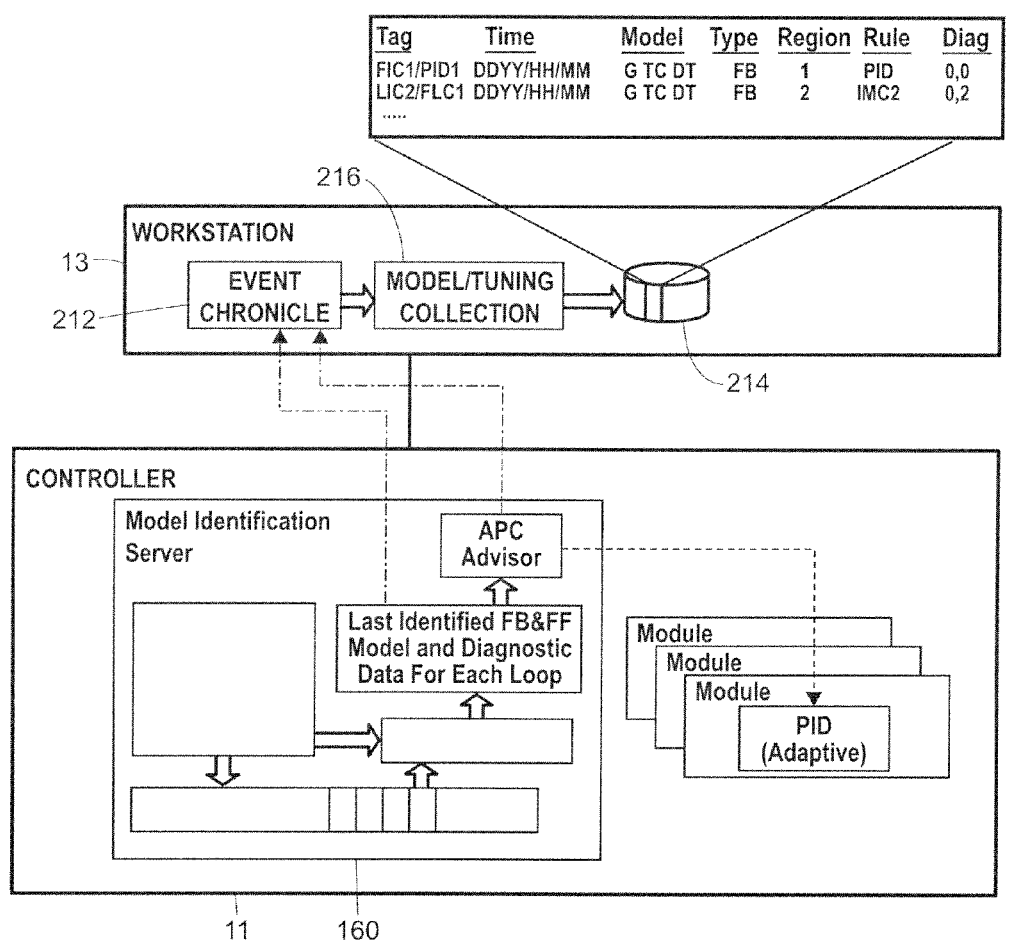
FIG. 8 is a schematic representation of the controller of FIG. 4 in accordance with an embodiment in which identified models are stored in an external database in association with historical event information.

With reference now to FIG. 8, one or more applications implemented by the workstations 13 provide performance monitoring, analysis, management and related functionality for the control loops and process models identified via the disclosed techniques. For example, the performance monitoring functions may include the generation of a process model history in which data indicative of the identified process models is entered for subsequent use or analysis. Further details regarding the generation and use of a process model history are set forth below. At one level, the history data may specify the process model parameters (e.g., dead time, time constant and gain) that completely define each process model identified by the disclosed techniques. Armed with that historical data, a number of analyses may be conducted regarding the control loop, its tuning, the control scheme (e.g., adaptive or non-adaptive), etc.

In some embodiments, one aspect of the process model history is directed to the generation of an event chronicle for the identified process models. More specifically, whenever a process model is identified either automatically in the controller 11 (FIG. 4) or on-demand from real-time or historical data (FIG. 6), the model identification routine implemented by the analytical server 160 may send an alert (or other message) to an event chronicle or tracking module 212. The event chronicle module 212 responds to the alert by generating data specifying the time and date of the model identification, along with any other data to facilitate the association of the model with the particular control loop, device, plant region, etc. In the exemplary embodiment shown in FIG. 8, data stored for each event includes a tag name for the device associated with the node or control loop, a date/time stamp, a model type (e.g., by identifying parameters such as dead time, time constant and gain), a control loop type (e.g., function block), a plant region number, a tuning rule, and a diagnosis indication for the control performance. The foregoing (or other) data may be stored as part of the process model history in a database 214 after processing by an application 216 that may, for instance, add one or more elements to the data set. The application 216 may correspond with one or more routines directed to monitoring and/or managing the tuning of each control loop.

The database 214 may store such historical data for control loops that reside in multiple controllers 11 within the system 10 and need not be limited to use with any one particular type of controller. For instance, the database 214 may store such data for third-party controllers.

Referring again to FIG. 1, as a general matter, the workstations 13 include (either individually, distributed or any other fashion) a suite of operator interface applications and other data structures 240 which may be accessed by any authorized user (e.g., a configuration engineer, operator, etc.) to view and provide functionality with respect to devices, units, etc. connected within the process plant 10. The suite of operator interface applications 240 is stored in a memory of the workstation 13 and each of the applications or entities within the suite of applications 240 is adapted to be executed on a respective processor(s) associated with each workstation 13. While the entire suite of applications 140 is illustrated as being stored in the workstation 13, some of these applications or other entities may be stored and executed in other workstations or computer devices within or associated or in communication with the system 10. Furthermore, the suite of applications 240 may provide display outputs to a display screen 14 associated with the workstation 13 or any other desired display screen or display device, including hand-held devices, laptops, other workstations, printers, etc. Likewise, the applications within the suite of applications 240 may be broken up and executed on two or more computers or machines and may be configured to operate in conjunction with one another.

Figure 9:
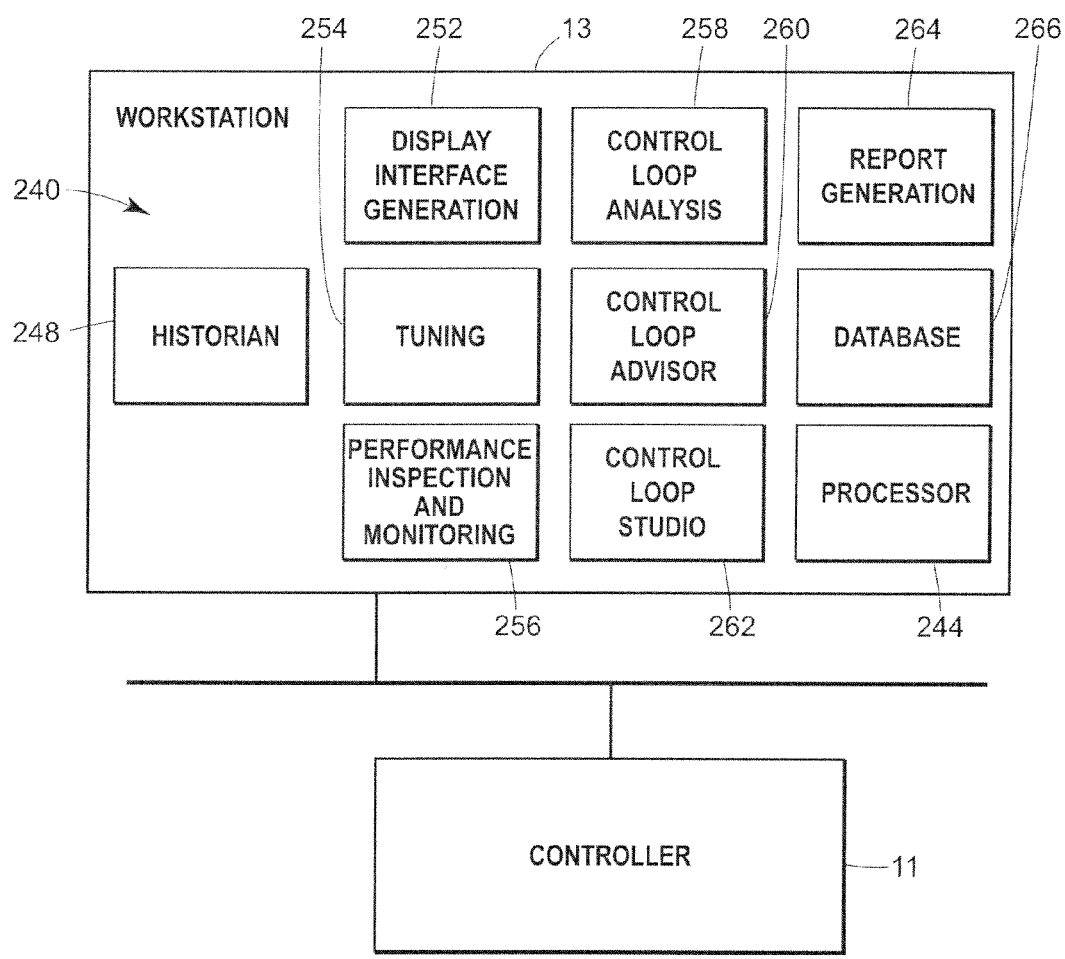
FIG. 9 is a schematic representation of a workstation in communication with a controller, the workstation including numerous support applications run on the workstation to communicate with the controller.

Specifically, referring to FIG. 9, the suite of applications 240 may include a number of applications, routines, modules, and other procedural elements directed to the implementation of model-based monitoring and management of the control system 10, as described herein. The applications, routines, modules and elements may be implemented via any combination of software, firmware and hardware and are not limited to the exemplary arrangement described herein. For instance, one or more applications may be integrated to any desired extent.

The application suite 240 may include a historian application 248 dedicated to supporting the recordation of process model data (e.g., parameters) as the models are identified via the above-described techniques. To this end, the historian application 248 may communicate with the historian database 12 (FIG. 1) or any other memory or storage mechanism. As described above, the process model data may be stored in connection or association with data chronicling the identification of the process model (or the collection of the data leading thereto). The historian application 248 may also provide analytical functionality such as the calculation of totals, averages and other values for selected model parameters. The historian application 248 may facilitate the viewing of such calculated values, as well as the underlying stored data, via one or more display interfaces.

Display interfaces may be provided by an application 252 directed to supporting communications with the controller 11. Such communications may involve or include the configuration and maintenance of adaptive control routines executing in the controller 11. As is the case throughout the application suite, the display interfaces may take any form, including without limitation dynamos, faceplates, detailed displays, dialog boxes, and windows, and may be configured for display on different display types.

The application suite may include an application 254 dedicated to use of the process model information in connection with tuning. As a result of the above-described model identification techniques, the tuning application 254 is directed to improving process control performance by calculating tuning parameters automatically from normal day-to-day changes in the plant, or from on-demand tuning tests. The tuning results may be used for both "open-loop" tuning recommendations, and for "closed-loop" adaptive control.

More specifically, the tuning application 254 may generate a number of display interfaces to support the performance of continuous tuning calculations for all control loops in either open loop or closed loop operation. The tuning calculations support both standard and adaptive control, on PID, fuzzy logic, and MPC controllers and, thus, provide tuning recommendations for both feedback and feedforward control. The tuning application 254 may also provide on-demand tuning, as described above, using either a relay oscillation or other procedure.

The tuning application 254 has access to the process model history data stored in the historian database 12 (or elsewhere, as desired) and, thus, may calculate optimal tuning using historical process model data. To that end, the display interfaces may provide or include tools to easily peruse the history to locate and select data suitable for such tuning calculations. This aspect of the display interface(s) generated by the tuning application 254 generally allows a user to change model parameters (e.g., time to steady state, event trigger threshold) and re-identify models, or identify models for loops that were not previously enabled for automatic model identification. The tuning application 252 may also provide an interface to support analysis of a history of tuning calculation results. This capability may facilitate the analysis of adaptive control opportunities and the improvement of adaptive control configurations.

As described above, the tuning application 254 may provide an interface to support the introduction of control "perturbations" that help identify controller tuning when there are few manual changes to the process (i.e., automatic injection on controller output). An option may be provided via the interface to disable perturbations once good tuning is calculated. If multiple control loops are being perturbed, the moves may be synchronized to distribute and minimize the process disturbance.

The tuning application 254 may be responsive to process states and other status indications, such that any calculation results are identified accordingly. In this manner, the disclosed system avoids the use of information calculated in the wrong state or with bad process data. To that end, model-related calculations may indicate whether the results are good, bad or not available, with explanations where appropriate. The tuning application 254 may also generate summary reports to convey, among other things, tuning recommendation information and a user log that documents tuning changes and any adaptive control tuning analysis.

Moreover, an application 256 is generally directed to automatic control performance monitoring utilizing the process models identified via the disclosed techniques. The application 256 is more specifically directed to improving process control performance by facilitating or automatically implementing (i) the identification of opportunities for control improvement, (ii) the analysis and diagnosis of the source of control problems, and (iii) the generation of meaningful performance reports for operations, control and maintenance personnel. To this end, the application 256 may generate a control performance index based on the process models. This "model-based" index provides a better benchmark to identify control loops that need re-tuning. The new index measures the opportunity for improving control based on factors such as process variability, the identified process model, and existing controller tuning. Such performance monitoring may, if applicable, take into consideration unit states and exclude performance calculations when the loop is in an inappropriate unit state, or when other status indications (e.g., Fieldbus status) or I/O communications are bad. Valve stiction, backlash and other valve diagnostic indices may also be provided for all valves.

The foregoing features and those described below are generally provided via a comparison of control performance performed by utilizing the process models that are automatically created via the disclosed techniques. Through the use of the process models, poorly tuned control loops and changes in the process that impact control performance may be identified. Deviations in the process model from the historic values may be used to flag the control loop as a potential process problem.

Again, using the process models, an oscillation index may also be generated by the application 256 to identify loops that are oscillating. More specifically, an oscillation analysis tool may identify other loops that have the same oscillation period and may be interacting with the primary loop. This information may then be used to identify process interactions and possible design recommendations.

Diagnostic information provided by the application 256 may be accompanied by an indication of the expected cause of poor control performance. For example, diagnostics may indicate whether poor control performance is caused by instrumentation errors, valve stiction or backlash, process interactions, or controller tuning.

Generally speaking, the control performance monitoring information may be provided in any desired form, including a number of customized display interfaces and reports. Historical performance reporting may be provided to display how a control loop has performed over a user-specified period of time. Default time periods for such reporting include last hour, last shift (8 hours), last day, last week, last month. The user may be provided an option to "drill down" from summary reports to access detailed loop information. The reports or interfaces may be customized for management summaries with, for instance, an overall weighted performance index for plant-wide and individual process units, trends and/or tables comparing the current period with prior periods, and lists of top priority loops with a corresponding performance measure. Maintenance reports may present control loop performance indices and prioritize work items based on their relevant importance to plant operations. Other reports may provide statistics including data for the control performance index, standard deviation, oscillation index, process model (if available), auto and cross correlation, histogram, power spectrum, etc.

The application suite 240 may also include a separate control loop analysis application 258. In some embodiments, the application 258 is made available via the display interface(s) generated by the application 256. In any event, the application 258 supports analysis of historian or real-time data collected in connection with the above-described model identification techniques. The data may be presented via an interface that facilitates the examination of variation in control from unmeasured disturbances and measurement noise. For example, the problems identified via the applications 254 and 256 may be further examined using the analysis application 258 for diagnosis. To that end, the display interface generated thereby may provide options for calculating power spectrum, autocorrelation and histogram data.

An advisor application 260 may generally provide functionality that utilizes the identified models in connection with diagnostics to detect abnormal conditions or opportunities to improve the control scheme through tuning or algorithm modifications. The information provided by the advisor application 260 may be provided in any type of display interface, including a faceplate generated via the workstation 13, the controller 11 or any other element in communication with the system 10. In one specific example, the display interface may have a flag for indicating the display of a new advisory message, such as "Check Tuning."

More generally, the advisor application 260 may provide recommendations generated as a result of analysis or diagnostics performed by any one of the applications in the suite. Furthermore, the recommendations need not be provided by a display interface generated by the advisor application, but rather may be sent for display to any one or more of the applications in the suite. Thus, recommendations and messages such as "New Tuning Available," "Examine Process—significant change in process has been detected," "Check Valve—dead band/hysteresis large," "Check Tuning—loop unstable," and "Control could be improved using MPC/Adapt" may be generally provided via the workstations 13 or other devices in communication with the process control system 10. In addition to the display of the message or recommendation, details regarding the underlying condition may be stored as a history or other parameter for the control loop. Subsequent access or use of the data stored for the control loop may then cause the details or associated message to be displayed for a user of the advisory or other application in the suite.

Other applications that also support the implementation of the disclosed techniques include a control studio application 262 to facilitate navigation within the process control system 10 and a report generation application 264 for the generation of the aforementioned reports. Lastly, one or more memories or databases 266 may also be provided as part of the application suite.

Any of the above-described applications may be implemented as routines, modules or other components of one or more integrated applications. The disclosed arrangement of application functionality is provided merely for ease in illustration and is not indicative of the broad range of manners in which the functionality may be provided to an operator or other user. Furthermore, the above-described applications may be provided in varying form depending on user profile, context, and other parameters, as desired. For example, the display interface views generated for one user type (e.g., engineering) may differ in content and other ways from the views generated for a different user type (e.g., maintenance).

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it may be apparent to those of ordinary skill in the art that changes, additions or deletions may be made to the disclosed embodiments without departing from the spirit and scope of the invention.

The invention claimed is:

1. A method of controlling a process, comprising:
   implementing a process control routine within a process control device by executing the process control routine on a processor of the process control device to implement on-line process control operations with respect to the process;
   implementing a server routine in the process control device, the server routine including a support algorithm, including executing the server routine on a processor of the process control device;
   using the process control routine to collect real-time process data;
   making one or more calls from the process control routine to the server routine;
   sending the collected process data to the server routine as part of one of the calls;
   running the support algorithm within the server routine on the collected process data associated with the process control routine to generate controller data in response to each of the one or more calls from the process control routine; and
   using the generated controller data in the process control routine to effect the manner in which the process control routine implements the on-line process control operations.

2. The method of claim 1, including executing the server routine asynchronously with respect to executing the process control routine.

3. The method of claim 1, wherein running the support algorithm includes executing a process model generation routine to create a process model.

4. The method of claim 1, including using the process control routine to collect further real-time process data for a subsequent call to the server while the server routine is running the support algorithm on the collected real-time process data sent as part of the first one of the calls.

5. The method of claim 1, further including sending the controller data from the server routine to a second device external to the process control device.

6. The method of claim 1, including simultaneously processing multiple calls from the process control routine via the server routine.

7. The method of claim 6, including determining an order in which to process the multiple calls based on priority information associated with the multiple calls.

8. The method of claim 6, including processing the multiple calls at the server routine using a queue.

9. The method of claim 1, wherein executing the process control routine on the processor of the process control device to implement on-line process control operations with respect to the process includes executing the process control routine on a processor once every execution period associated with the process control routine, and wherein making the one or more calls from the process control routine to the server routine includes making a call from the process control routine to the server routine less than once every execution period associated with the process control routine.

10. The method of claim 1, including executing the process control routine on the same processor as the server routine.

11. The method of claim 1, including executing the process control routine on a first processor disposed within a control device and executing the server routine on a second processor disposed within the control device, wherein the second processor is separate from the first processor.

12. A method of controlling a process, comprising:
    implementing multiple process control routines within a single process control device by executing the multiple process control routines on a processor of the process control device to implement multiple on-line process control operations with respect to the process;
    implementing a server routine in the process control device, the server routine including a support algorithm, including executing the server routine on a processor of the process control device;
    collecting real-time process data at one of the multiple control routines;
    making at least one call from each of the multiple process control routines to the server routine at different times;
    sending the collected real-time process data to the server routine as part of a call from the one of the multiple process control routines;
    in response to each of the calls from the multiple process control routines, running the support algorithm within the server routine on the collected process data associated with one of the multiple process control routines to generate controller data for the one of the multiple process control routines; and using the generated controller data generated by the server routine in the multiple process control routines to effect the manner in which the multiple process control routines implement the on-line process control operations.

13. The method of claim 12, including executing the server routine on a processor of the process control device asynchronously with respect to executing the multiple process control routines on a processor of the process control device.

14. The method of claim 12, wherein running the support algorithm includes executing a process model generation routine to create a process model.

15. The method of claim 12, including using the server routine to simultaneously process multiple calls from different ones of the multiple process control routines.

16. The method of claim 15, including determining an order in which to process the multiple calls based on priority information associated with the multiple calls.

* * * * *

UNITED STATES PATENT AND TRADEMARK OFFICE
CERTIFICATE OF CORRECTION

PATENT NO. : 8,046,096 B2
APPLICATION NO. : 12/782946
DATED : October 25, 2011
INVENTOR(S) : David R. Denison et al.

Page 1 of 1

It is certified that error appears in the above-identified patent and that said Letters Patent is hereby corrected as shown below:

In the Specification:

At Column 11, line 52, "are" should be -- is --.

Signed and Sealed this
Fourteenth Day of May, 2013

Teresa Stanek Rea
*Acting Director of the United States Patent and Trademark Office*